(12) United States Patent
Pawar et al.

(10) Patent No.: US 8,204,871 B1
(45) Date of Patent: Jun. 19, 2012

(54) EXTENDED FILE MAPPING CACHE FOR FAST INPUT-OUTPUT

(75) Inventors: Sitaram Pawar, Shrewsbury, MA (US);
Philippe Armangau, Acton, MA (US);
Yubing Wang, Holden, MA (US);
Christopher Seibel, Walpole, MA (US);
Soumyadeep Sen, Highland Park, NJ (US)

(73) Assignee: EMC Corporation, Hopkinton, MA (US)

( * ) Notice: Subject to any disclaimer, the term of this patent is extended or adjusted under 35 U.S.C. 154(b) by 93 days.

(21) Appl. No.: 12/892,812

(22) Filed: Sep. 28, 2010

(51) Int. Cl.
*G06F 17/30* (2006.01)

(52) U.S. Cl. ........ 707/705; 707/639; 707/673; 707/711; 707/715; 707/825; 707/829

(58) Field of Classification Search .................. 707/639, 707/673, 705, 711, 715, 825, 829
See application file for complete search history.

(56) References Cited

U.S. PATENT DOCUMENTS

| | | | |
|---|---|---|---|
| 5,893,140 A | 4/1999 | Vahalia et al. | |
| 5,933,603 A | 8/1999 | Vahalia et al. | |
| 7,555,504 B2 | 6/2009 | Bixby et al. | |
| 7,631,155 B1 | 12/2009 | Bono et al. | |
| 7,822,927 B1 | 10/2010 | Scheer | |
| 7,849,057 B1 * | 12/2010 | Kazar et al. | 707/639 |
| 7,849,112 B2 | 12/2010 | Mane et al. | |
| 7,953,819 B2 | 5/2011 | Liang et al. | |
| 8,032,498 B1 | 10/2011 | Armangau et al. | |
| 8,041,888 B2 * | 10/2011 | Rajan et al. | 711/112 |
| 2003/0115439 A1 * | 6/2003 | Mahalingam et al. | 712/1 |
| 2005/0066095 A1 | 3/2005 | Mullick et al. | |
| 2011/0022780 A1 * | 1/2011 | Wakrat et al. | 711/103 |
| 2012/0016840 A1 * | 1/2012 | Lin et al. | 707/626 |

OTHER PUBLICATIONS

Vahalia, Uresh, Unix Internals: The New Frontiers, 1996, p. 261-290, Prentice-Hall, Inc., Upper Saddle River, NJ.
Nowicki, Bill, Network Working Group, RFC 1094, "NFS: Network File System Protocol Specification," Mar. 1989, 27 pages, Sun Microsystems, Inc., Santa Clara, CA.
Leach, Paul, and Naik, Dilip, "A Common Internet File System," Dec. 19, 1997, 121 pages, Microsoft Corporation, Redmond, WA.
Shepler et al., "Network File System (NFS) Version 4 Protocol," Network Working Group, Request for Comments: 3530, Apr. 2003, 275 pages, The Internet Society, Reston, VA.

* cited by examiner

*Primary Examiner* — Shahid Alam
*Assistant Examiner* — Andalib Lodhi
(74) *Attorney, Agent, or Firm* — Richard Auchterlonie; Novak Druce & Quigg, LLP

(57) ABSTRACT

A file server has an extent cache of pointers to leaf-level indirect blocks containing file mapping metadata. The extent cache improves file access read and write performance by returning a mapping for the data blocks to be read or written without having to iterate through intermediate level indirect blocks of the file. In addition, the extent cache contains pointers to the leaf-level indirect blocks in the file system cache. Therefore, in most cases, the time spent looking up pointers in the extent cache is offset by a reduction in the time that would otherwise be spent in locating the leaf-level indirect blocks in the file system cache. In a preferred implementation, the extent cache has a first least recently used (LRU) list and cache entry allocation for production files, and a second LRU list and cache entry allocation for snapshot copies of the production files.

20 Claims, 14 Drawing Sheets

EXTENDED FILE MAPPING CACHE FOR FAST INPUT-OUTPUT

FIELD OF THE INVENTION

The present invention relates generally to file servers, and more specifically to programming of a file server for read or write access to a file in a file system.

BACKGROUND OF THE INVENTION

Network data storage is most economically provided by an array of low-cost disk drives integrated with a large semiconductor cache memory. A number of data mover computers are used to interface the cached disk array to the network. The data mover computers perform file locking management and mapping of the network files to logical block addresses of storage in the cached disk array, and move data between network clients and the storage in the cached disk array. See, for example, Vahalia et al. U.S. Pat. No. 5,893,140 issued Apr. 6, 1999, entitled "File Server Having a File System Cache and Protocol for Truly Safe Asynchronous Writes," incorporated herein by reference.

Typically the logical block addresses of storage are subdivided into logical volumes. Each logical volume is mapped to the physical storage using a respective striping and redundancy scheme. The data mover computers typically use the Network File System (NFS) protocol to receive file access commands from clients using the UNIX (Trademark) operating system or the LINUX (Trademark) operating system, and the data mover computers use the Common Internet File System (CIFS) protocol to receive file access commands from clients using the MicroSoft (MS) WINDOWS (Trademark) operating system. The NFS protocol is described in "NFS: Network File System Protocol Specification," Network Working Group, Request for Comments: 1094, Sun Microsystems, Inc., Santa Clara, Calif., March 1989, 27 pages, and in S. Shepler et al., "Network File System (NFS) Version 4 Protocol," Network Working Group, Request for Comments: 3530, The Internet Society, Reston, Va., April 2003, 262 pages. The CIFS protocol is described in Paul J. Leach and Dilip C. Naik, "A Common Internet File System (CIFS/1.0) Protocol," Network Working Group, Internet Engineering Task Force, The Internet Society, Reston, Va., Dec. 19, 1997, 121 pages.

The Network File System (NFS) protocol and the Common Internet File System Protocol (CIFS) permit network clients to share access to files in a file system. A popular kind of file system is a UNIX-based file system as described in Uresh Vahalia, *Unix Internals—The New Frontiers*, Chapter 9, File System Implementations, pp. 261-290, Prentice-Hall, Inc., Upper Saddle River, N.J. (1996). A file in a Unix-based file system is a hierarchy of file system blocks. The file system block at the top or root of the hierarchy is called an "inode." The inode contains attributes of the file, such as the file type, the size of the file, user and group IDs of the owner of the file, timestamps, and permissions and mode flags. The inode also contains a block pointer array including pointers to one or more file system blocks that are directly below the inode in the hierarchy. The data of the file is contained in one or more file system blocks at the bottom or leaves of the hierarchy. If the file contains more than ten data blocks, then there will be at least one indirect block directly below inode in the hierarchy. Each indirect block includes an array of up to 256 block pointers. In a very large file, the can be up to three indirect blocks along the path from the inode down to a data block of the file.

The fact that the file contains pointers to the data blocks in the file permits any free block of the file system to be allocated to a file of the file system and mapped to any logical block of the logical extent of the file. The additional flexibility of file system block allocation permits more efficient storage utilization by reducing storage fragmentation and permitting sparse files and efficient dynamic extension of files. In addition, the flexibility of allocating any free file system block to any logical block in the logical extent of a file supports supplementary storage services such as a snapshot copy facility in which file system indirect blocks and file system data blocks are shared between a production file and snapshot copies of the production file. However, the additional flexibility of file system block allocation has an associated cost of searching the block hierarchy of a file from the inode down to a leaf-level indirect block to obtain the block mapping for a specified offset in the logical extent of the file when performing a read or write of data to the file.

Recently there has been a trend for network clients to share random concurrent access to large files. This trend has been facilitated by the Network File System (NFS) Version 4 Protocol, which has support for byte range file locking. The file locking support is structured so that an RPC callback mechanism is not required. See Shepler et al., "Network File System (NFS) version 4 Protocol," Request for Comments 3530, April 2003, 275 pages, Network Appliance, Inc., Sunnyvale, Calif.

SUMMARY OF THE INVENTION

It has been discovered that it is possible to improve the lookup of file mapping metadata by caching pointers to most recently accessed leaf-level indirect blocks in a file system. This creates a shortcut to the data block addresses for a specified offset and range in the logical extent of a file. Therefore the cache of pointers to the most recently accessed leaf-level indirect blocks will be called an "extent cache."

A further improvement is obtained when the pointers to the most recently accessed leaf-level indirect blocks include pointers to entries in the file system cache containing the most recently accessed leaf-level indirect blocks. In this case, in a properly sized system, the time required for accessing the extent cache does not directly impact the access time for a read or write of data to a file because there is a good likelihood that the extent cache lookup will return a pointer to the desired leaf-level indirect block in the file system cache. Thus, most of the time spent looking up pointers in the extent cache is offset by a reduction in the time that would otherwise be spent in locating the leaf-level indirect blocks in the file system cache.

In accordance with a first aspect, the invention provides a computer-implemented method of operating a file server. The file server includes random access memory, data storage, and a data processor coupled to the random access memory and coupled to the data storage for maintaining a file system in the data storage and for maintaining a file system cache in the random access memory. The file system includes file system blocks. The file system blocks include inodes defining attributes of files in the file system, data blocks storing data of the files, and indirect blocks linking inodes to data blocks so that at least some of the files each include an inode and a hierarchy of indirect blocks linking the inode to data blocks. The hierarchy includes leaf-level indirect blocks each containing pointers to data blocks. The file system cache contains recently accessed file system blocks. The method includes the data processor executing computer instructions stored on a non-transitory computer-readable storage medium to perform the steps of maintaining, in the random access memory, an extent cache of pointers to recently accessed leaf-level indirect blocks, the extent cache including an index for searching the extent cache for a pointer to a recently accessed leaf-level indirect block mapping a data block of a specified file to a specified offset in a logical extent of the specified file, and responding to a request to read data from or write data to the specified offset in the logical extent of the specified file. The request to read data from or write data to the specified offset in the logical extent of the specified file is responded to by: (1) accessing the index to search the extent cache for the pointer to the recently accessed leaf-level indirect block mapping the data block of the specified file to the specified offset in the logical extent of the specified file, and to find, in the extent cache, the pointer to the recently accessed leaf-level indirect block mapping the data block of the specified file to the specified offset in the logical extent of the specified file, and (2) using the pointer found in the extent cache to obtain a pointer to the data block mapped to the specified offset in the logical extent of the specified file, and (3) using the pointer to the data block mapped to the specified offset in the logical extent of the specified file to read data from or write data to the data block mapped to the specified offset in the logical extent of the specified file.

In accordance with another aspect, the invention provides a file server including random access memory, data storage, and a data processor coupled to the random access memory and coupled to the data storage for maintaining a file system in the data storage and maintaining a file system cache in the random access memory. The file system includes file system blocks. The file system blocks include inodes defining attributes of files in the file system, data blocks storing data of the files, and indirect blocks linking inodes to data blocks so that at least some of the files each include an inode and a hierarchy of indirect blocks linking the inode to data blocks. The hierarchy includes leaf-level indirect blocks each containing pointers to data blocks. The file system cache contains recently accessed file system blocks. The file server further includes a non-transitory computer readable storage medium storing computer instructions that, when executed by the data processor, perform the steps of maintaining, in the random access memory, an extent cache of pointers to recently accessed leaf-level indirect blocks, the extent cache including an index for searching the extent cache for a pointer to a recently accessed leaf-level indirect block mapping a data block of a specified file to a specified offset in a logical extent of the specified file, and responding to a request to read data from or write data to the specified offset in the logical extent of the specified file. The request to read data from or write data to the specified offset in the logical extent of the specified file is responded to by (1) accessing the index to search the extent cache for the pointer to the recently accessed leaf-level indirect block mapping the data block of the specified file to the specified offset in the logical extent of the specified file, and to find, in the extent cache, the pointer to the recently accessed leaf-level indirect block mapping the data block of the specified file to the specified offset in the logical extent of the specified file, and (2) using the pointer found in the extent cache to obtain a pointer to the data block mapped to the specified offset in the logical extent of the specified file, and (3) using the pointer to the data block mapped to the specified offset in the logical extent of the specified file to read data from or write data to the data block mapped to the specified offset of the specified file.

In accordance with a final aspect, the invention provides a non-transitory computer readable storage medium storing computer instructions that, when executed by a data processor in a file server, perform the steps of maintaining, in random access memory of the file server, an extent cache of pointers to recently accessed leaf-level indirect blocks of a file system in data storage of the file server, the extent cache including an index for searching the extent cache for a pointer to a recently accessed leaf-level indirect block mapping a data block of a specified file to a specified offset in a logical extent of the specified file, and responding to a request to read data from or write data to the specified offset in the logical extent of the specified file. The request to read data from or write data to the specified offset in the logical extent of the specified file is responded to by: (1) accessing the index to search the extent cache for the pointer to the recently accessed leaf-level indirect block mapping the data block of the specified file to the specified offset in the logical extent of the specified file, and to find, in the extent cache, the pointer to the recently accessed leaf-level indirect block mapping the data block of the specified file to the specified offset in the logical extent of the specified file, and (2) using the pointer found in the extent cache to obtain a pointer to the data block mapped to the specified offset in the logical extent of the specified file, and (3) using the pointer to the data block mapped to the specified offset in the logical extent of the specified file to read data from or write data to the data block mapped to the specified offset of the specified file.

BRIEF DESCRIPTION OF THE DRAWINGS

Additional features and advantages of the invention will be described below with reference to the drawings, in which.

Figure 1:
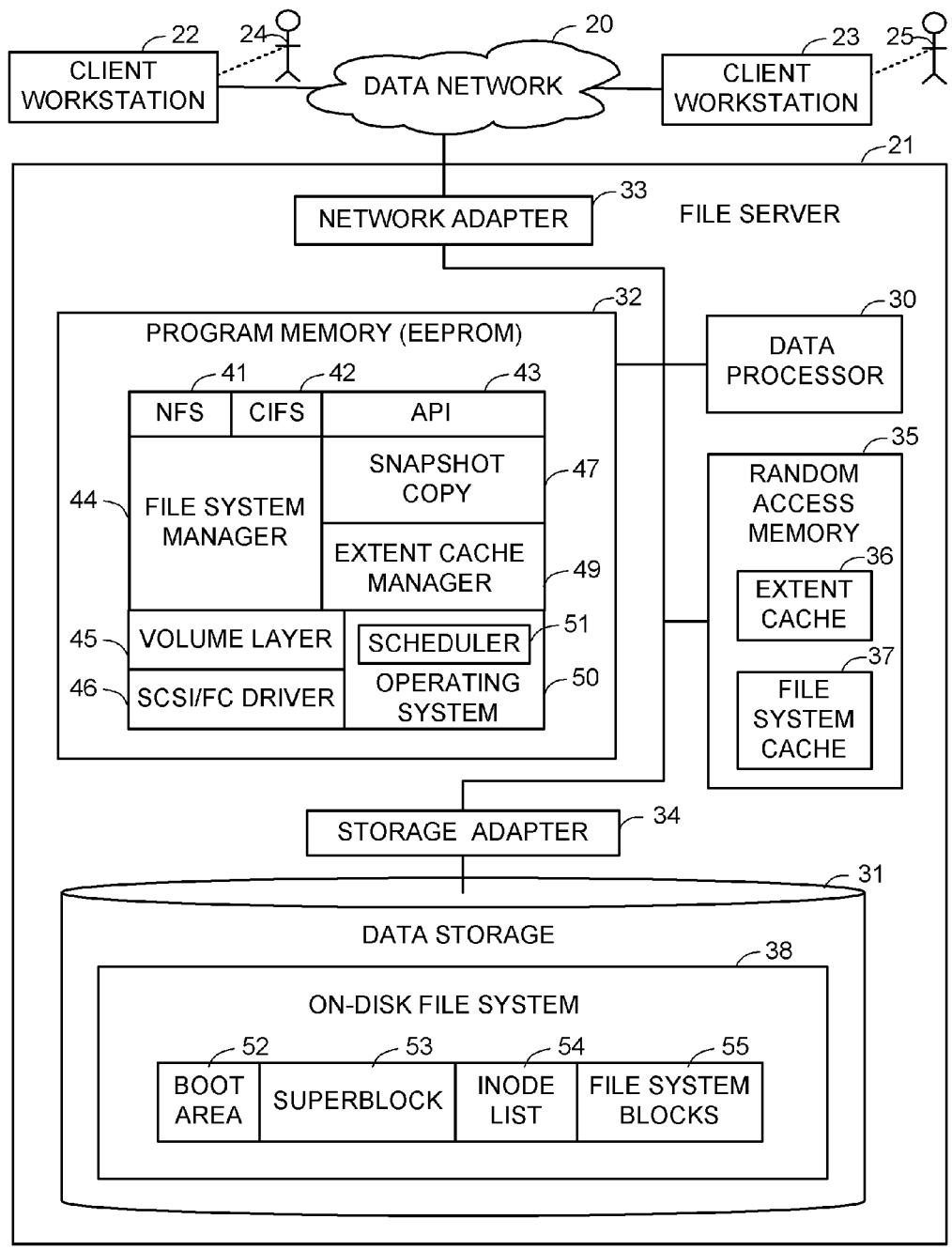
FIG. 1 is a block diagram of a data processing system including a network file server having an extent cache in accordance with the present invention.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown a data network 20 including a file server 21 servicing client workstations 22, 23 operated by human users 24, 25. The file server includes a network adapter 33 linking the file server 21 to the data network 20, and a data processor 30 coupled to the network adapter 33 and programmed for responding to client requests for access to files in data storage 31. The data processor 30 is a general purpose digital computer data processor including one or more core central processing units (CPUs) for executing computer program instructions stored in a program memory 32.

The program memory 32 is a non-transitory computer readable storage medium, such as electrically erasable and programmable read-only memory (EEPROM). In general, non-transitory computer readable storage medium is a physical device or physical material which serves to store computer-readable data on a permanent or semi-permanent basis. Examples of other kinds of non-transitory computer readable storage medium include magnetic disks, magnetic tape, and optical disks.

The program memory 32 stores an operating system program 50 and various other programs executed under control of the operating system program. The operating system 50 includes a task scheduler 51 for scheduling tasks of different priority. The task scheduler 51 may schedule real-time (RT) tasks and also general purpose (GP) tasks programmed as code threads. The task scheduler 51, for example, maintains application timers, and schedules execution and context switching between real-time (RT) and general purpose (GP) code threads. A suitable task scheduler is shown and described in FIG. 7 and columns 11 to 13 of Vahalia et al. U.S. Pat. No. 5,933,603 issued Aug. 3, 1999, incorporated herein by reference.

The other programs executed under control of the operating system 50 include a Network File System (NFS) module 41, a Common Internet File System (CIFS) module 42, and an application program interface (API) module 43. The NFS module 41 recognizes file access commands received by the network adapter 33 from the client workstations 22, 23 in accordance with the NFS protocol. The CIFS module 42 recognizes file access commands received by the network adapter 33 from the client workstations 22, 23 in accordance with the CIFS protocol. For example, network clients such as UNIX (Trademark) workstations may use the Network File System (NFS) protocol to access files in the data storage 31, and network clients such as Microsoft Windows (Trademark) workstations may use the Common Internet File System (CIFS) protocol to access files in the data storage 31.

The application program interface (API) module 43 recognizes additional file access commands which may extend the functionality of the NFS and CIFS protocols. For example, if the NFS module 41 or the CIFS module 42 receives a file access request including an operation code that is not in accordance with the NFS or CIFS protocol, then the NFS module 41 or the CIFS module 42 will invoke the API module 43 in an attempt to execute the operation or function. The API module 43 may also respond to remote procedure calls from network clients in accordance with other network protocols, such as the Simple Network Management Protocol (SNMP) or the Hypertext Transfer Protocol (HTTP).

The file system manager 44 manages at least one hierarchical file system 38 in the data storage 31. A suitable kind of file system is the UNIX file system, as described in Chapter 9, pp. 261-289 of Uresh Vahalia, Unix Internals: The New Frontiers, 1996, Prentice Hall, Inc., Simon & Schuster, Upper Valley River, N.J. 07458. The file system manager 44 maintains a file system cache 37 in random access memory 35 as further described in Vahalia et al. U.S. Pat. No. 5,893,140 issued Apr. 6, 1999, entitled "File Server Having a File System Cache and Protocol for Truly Safe Asynchronous Writes," incorporated herein by reference.

The data processor 30 is also programmed with a snapshot copy facility 47. A suitable kind of snapshot copy facility is described in Bixby et al., U.S. Pat. No. 7,555,504 issued Jun. 30, 2009 and entitled "Maintenance of a File Version Set Including Read-Only and Read-Write Snapshot Copies of a Production File," incorporated herein by reference. This snapshot copy facility may share file system data blocks and file system indirect blocks between a production file and snapshot copies of the production file.

The data processor 30 is programmed with a volume layer 45 for organizing the data storage 31 into logical volumes of data blocks, and a Small Computer System Interface (SCSI) or Fibre Channel (FC) driver 46 for linking the volume layer 45 to the data storage 31 through a storage adapter 34.

The on-disk layout of the file system 38 includes a boot area 52, a superblock 53, an inode list 54, and file system blocks 55. The boot area 52 may contain code for booting an operating system. The superblock 53 contains attributes and metadata of the file system itself. The inode list 54 is a linear array of inodes. There is one inode for each file in the file system. Each inode can be identified by its inode number, which equals its index in the inode list. Several inodes may fit into one of the file system blocks 55. The inode number can be easily translated into a block number and an offset of the inode from the start of the block. Each inode contains metadata of the file. (See Vahalia, *Unix Internals—The New Frontiers*, page 263.) Some of the file system blocks 55 are data blocks, and other file system blocks are indirect blocks, as described below with reference to FIG. 3, or free blocks that have not yet been allocated to any file in the file system.

Figure 2:
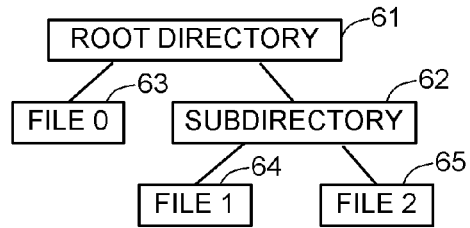
FIG. 2 is a block diagram of a network file system as seen by a network client.

The files in the on-disk file system 38 are linked together by a directory hierarchy into a tree structure, as shown in FIG. 2. The tree structure is visible to the human users 24, 25 and accessible to programs executed on the client workstations 22, 23. The tree structure includes a root directory 61, a subdirectory 62, and files 63, 64, and 65. The directories 61 and 62 are a special kind of file containing data maintained by the file system manager 44 in FIG. 1. The files 63, 64, and 65 at the bottom of the tree structure are regular files containing data maintained by programs executed on the client workstations.

In accordance with an aspect of the present invention, the data processor 30 in FIG. 1 is further programmed with an extent cache manager 49 for managing an extent cache 36 in the random access memory 35. The extent cache 36 contains pointers to most recently accessed leaf-level indirect blocks in the on-disk file system 38. This creates a shortcut to the data block addresses for a specified offset and range in the logical extent of a file.

Figure 3:
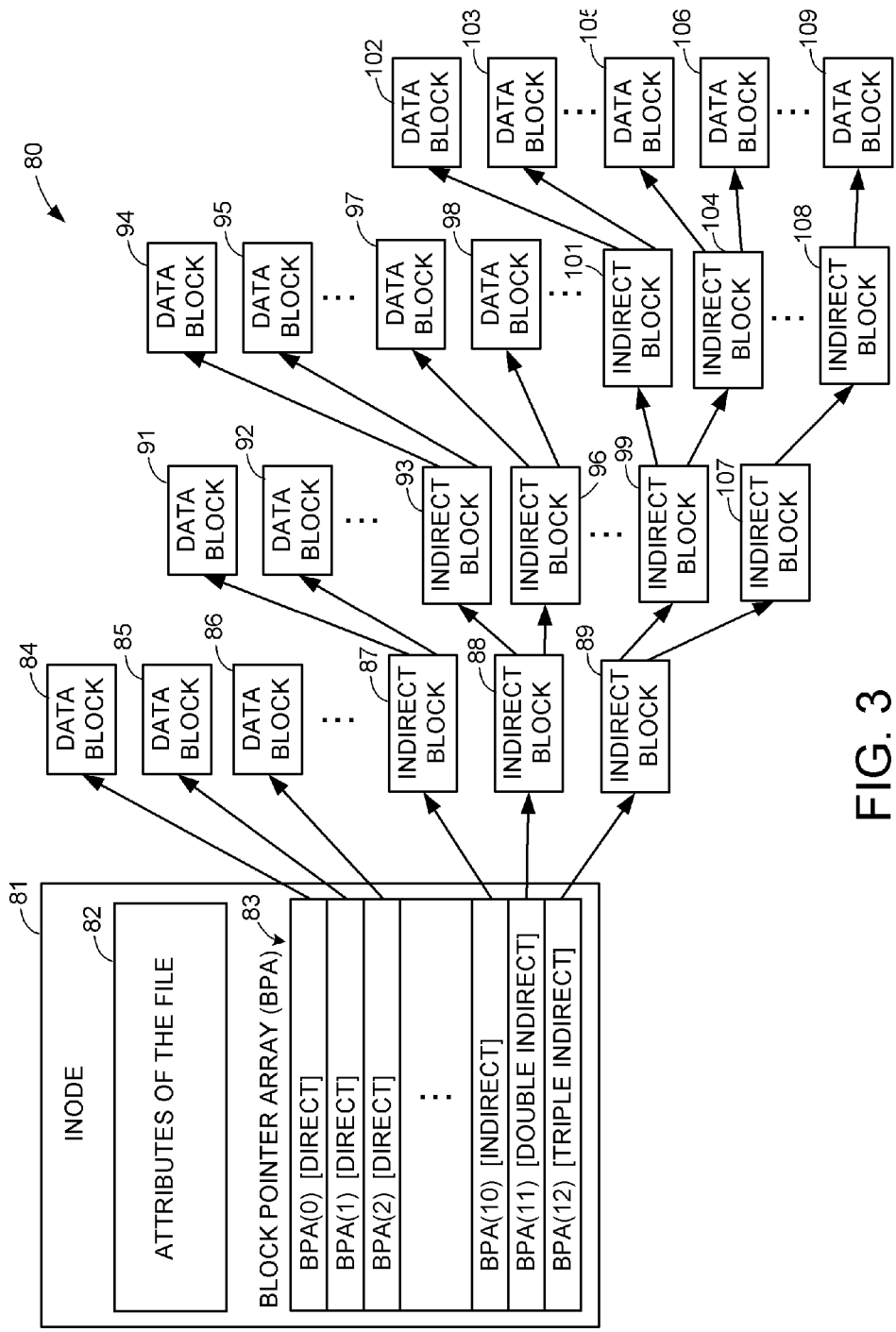
FIG. 3 is a block diagram of a file in a UNIX-based file system.

The leaf-level indirect blocks are the indirect blocks that contain pointers to file system data blocks. For example, FIG. 3 shows a file 80 using the indirect mapping of the UNIX-based file system. The file 80 includes an inode 81 containing attributes 82 of the file, and a block pointer array 83. The block pointer array 83 has thirteen block pointer array entries having respective values BPA(0) to BPA(12). The first of up to ten entries BPA(0) to BPA(9) directly point to the first of up to ten data blocks 84, 85, 86, etc. of the file 80. (See Vahalia, Unix Internals—The New Frontiers, FIGS. 9-4, page 265.)

If the file 80 contains more than ten data blocks, then the eleventh entry of the block pointer array 83 contains an indirect block pointer BPA(10) pointing to an indirect block 87 containing pointers to one or more additional data blocks 91, 92, etc. If the file 80 contains so many data blocks that the indirect block 87 becomes full of block pointers, then the twelfth entry of the block pointer array 83 contains a double indirect block pointer BPA(11) to an indirect block 88 that itself points to an indirect block 93 that points to one or more additional data blocks 94, 95, etc. If the file 80 is so large that the indirect block 93 becomes full of block pointers, then the indirect block 88 will point to at least one more indirect block 96 that points to one or more additional data blocks 97, 98, etc.

If the file 80 is so large that the indirect block 88 becomes full of block pointers and its descendant indirect blocks are also full of block pointers, then the thirteenth entry of the block pointer array 83 contains a triple indirect block pointer BPA(12) to an indirect block 89 that points to an indirect block 99 that points to an indirect block 101 that points to one or more additional data blocks 102, 103, etc. If the file is so large that the indirect block 101 becomes full of pointers, then the indirect block 99 points to another indirect block 104 that points to one or more data blocks 105, 106, etc. If the file is so large that the indirect block 99 and its descendant indirect blocks are also full of pointers, then the indirect block 89 points to another indirect block 107 that points to yet another indirect block 108 that points to at least one data block 109, and so on. Once the indirect block 89 and its descendant indirect blocks become full of pointers, the file contains a maximum permitted number of data blocks.

In short, the leaf-level indirect blocks shown in FIG. 3 are the indirect blocks 87, 93, 96, 101, 104, and 108.

Figure 4:
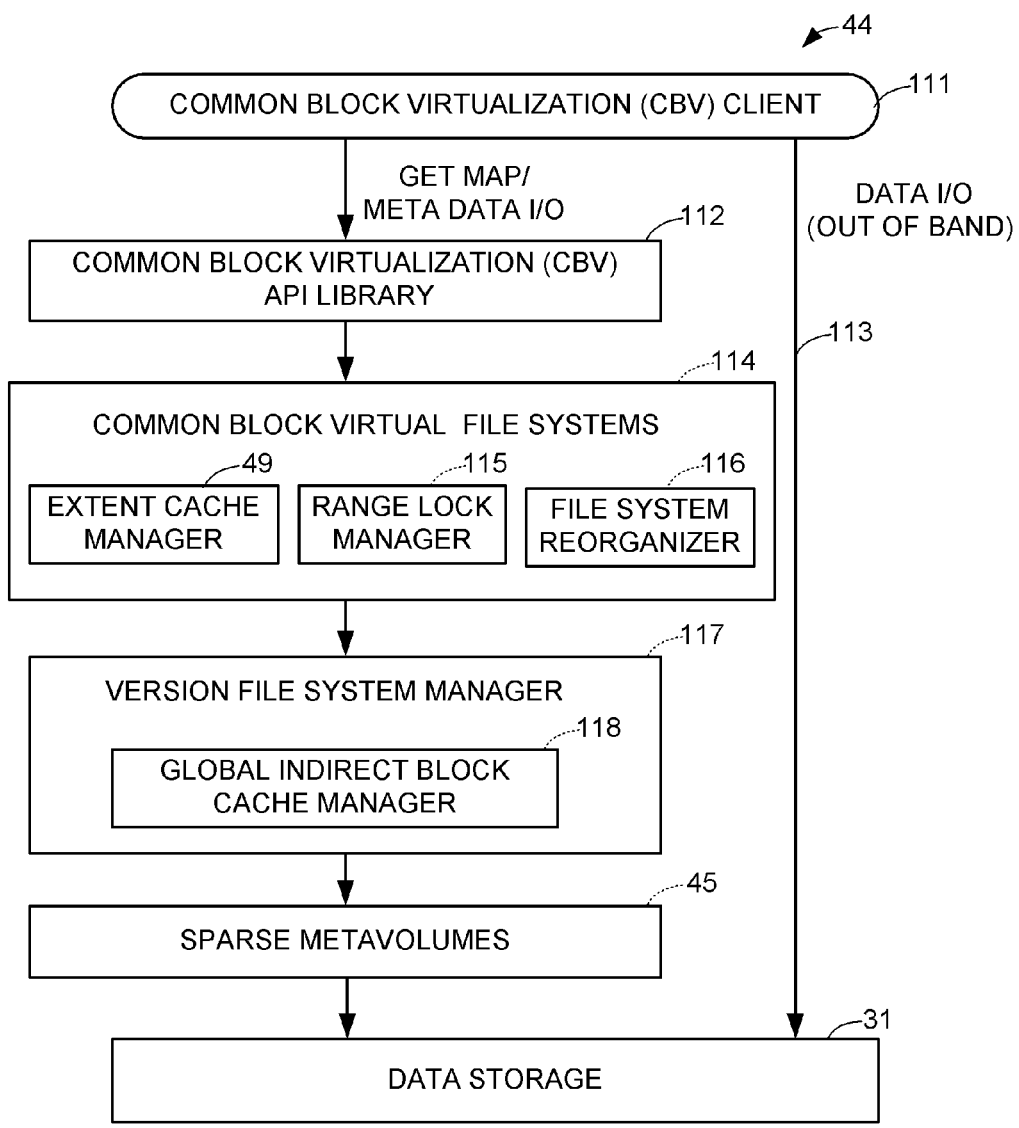
FIG. 4 is a block diagram showing a preferred organization of file system manager components in the file server of FIG. 1.

The preferred organization of the file system manager 44 is shown in FIG. 4. This file system manager 44 has a range lock manager 115 performing byte range file locking as further described in Mullick et al., Patent Application Publication 2005/0066095 A1 published Mar. 24, 2005, entitled "Multi-Threaded Write Interface and Methods for Increasing the Single File Read and Write Throughput of a File Server," incorporated herein by reference. This file system manager 44 also has a file system reorganizer 116 and a number of program layers as further described in Bono et al, U.S. Pat. No. 7,631,155 issued Dec. 8, 2009, entitled "Thin Provisioning of a File System and an ISCSI LUN Through a Common Mechanism," incorporated herein by reference.

The extent cache manager 49 is incorporated into a common block virtual file systems programming layer 114 that also incorporates the range lock manager 115 and the file system reorganizer 116. A version file system manager 117 is layered below the common block virtual file systems layer 114 and above the volume layer 45, which has the capability of managing sparse metavolumes. The version file systems manager 117 manages the file system cache (37 in FIG. 1), and provides a global indirect block cache manager 118 that is invoked to fetch block mapping metadata after the extent cache manager 49 does a lookup in the file system extent cache 37 of a pointer to a leaf-level indirect block.

In operation, a common block virtualization (CBV) client 111 responds to a read or write request from an application program in the file server (21 in FIG. 1) or from a network client (22, 23 in FIG. 1) by first getting a map of the file mapping metadata for the read or write operation from a common block virtualization (CBV) API library and then issuing one or more block I/O requests to the data storage 31.

The CBV API library 112 responds to the "get map" request from the CBV client 111 by invoking the common block virtual file systems layer 114 to access the range lock manager 115 to obtain a shared range lock over the range of the logical extent of the file specified by the read or write request, and then fetch the file mapping metadata by invoking the extent cache manager 49, as further described below with reference to FIG. 6.

Figure 5:
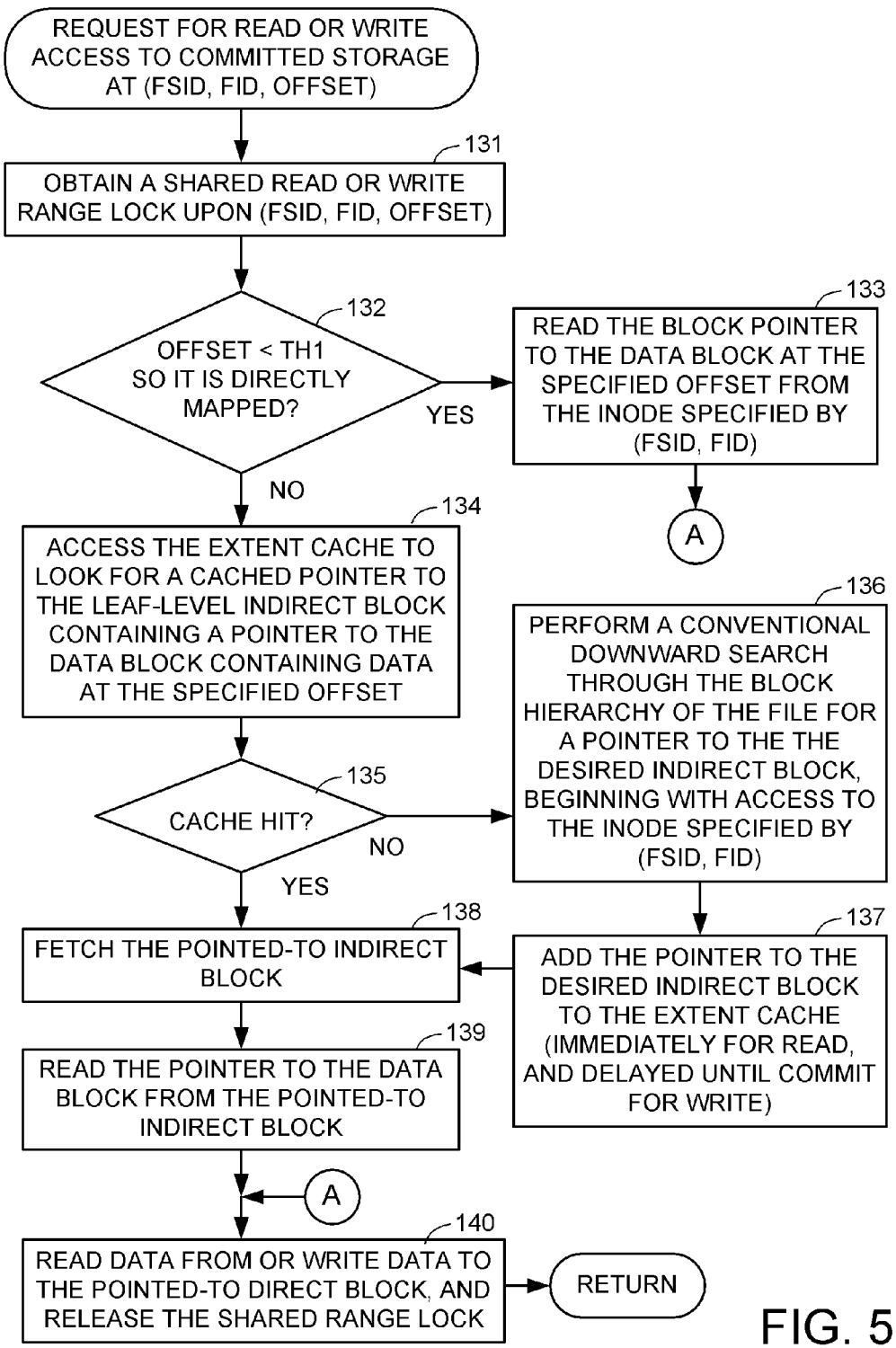
FIG. 5 is a flowchart showing use of the extent cache when the file server responds to a request to read data from or write data to a specified offset in the logical extent of a specified file.

FIG. 5 shows use of the extent cache when the file server responds to a request to read data from or write data to a specified offset in the logical extent of a specified file. In this example, the read or write request specifies a file handle and an offset of a single logical block in the logical extent of the file. The file handle, for example, includes a file system identifier (FSID) and a file identifier (FID).

In a first step 131, the range lock manager places a shared read or write range lock upon the specified offset for the file specified by the file handle. For a read request, the range lock manager places a shared read range lock upon the specified offset for the file specified by the file handle. For a write request, the range lock manager places a shared write range lock upon the specified offset for the file specified by the file handle. The range lock manager provides different range locks for read or write for synchronization with the file system reorganizer. The shared range locks prevent the reorganizer from moving the file system blocks during lookup. The shared read range lock is released when the read operation has been completed, and the shared write range lock is released when the write operation has been committed to storage (step 140 in FIG. 5).

The reorganizer must obtain a "mapping for write" exclusive range lock over a range of the extent of a file before moving blocks mapped to that range. Once obtained, this "mapping for write" exclusive range lock precludes any other process from writing to the locked range in the offset of the file. After the reorganizer moves the blocks, the reorganizer also obtains a "mapping for read" exclusive range lock over locked range in the offset of the file, and then commits the new block mapping and invalidates the old block mapping in the extent cache, and then releases the exclusive locks. The "mapping for read" exclusive range lock ensures that other processes will not read from the old block mapping after the new block mapping has been committed and the old block mapping has been invalidated.

In step 132 of FIG. 5, if the offset is less that a threshold (TH1), then the data block to be accessed is directly mapped in the inode of the file, and execution branches to step 133 to read the desired block mapping metadata from the inode specified by the file handle (FSID, FID). In this case the data block to be accessed is not mapped in an indirect block. In addition, such a direct block mapping is not cached in the extent cache because the direct block mapping can be fetched in an efficient manner from the inode specified by the file handle. For the file organization as described in FIG. 3, if the offset is in units of blocks and the first block is at an offset of zero, then the threshold (TH1) is ten. Execution continues from step 133 to step 140 to read data from or write data to the pointed-to direct block, and then to release the shared range lock, and then execution returns.

In step 132, if the offset is not less than the threshold (TH1), then execution continues from step 132 to step 134. In step 134, the extent cache is accessed to look for a cached pointer to the indirect block containing a pointer to the data block containing data at the specified offset. In step 135, if there is not an entry in the cache containing such a pointer so that there is not a cache hit, then execution continues to step 136 to perform a conventional downward search through the block hierarchy of the file for a pointer to the desired indirect block, beginning with access to the inode specified by the file handle (FSID, FID). Execution continues from step 136 to step 137. In step 137, the pointer to the desired indirect block is added to the extent cache. This is done immediately if the block mapping is requested for a read operation. If the block mapping is requested for a write operation, then the addition of the pointer into the extent cache is delayed until commit for write. When a commit is performed for the write operation, the pointer to the desired indirect block is added to the extent cache.

By adding entries to the extent cache when a commit is performed for the write operation, the extent cache is kept in sync with the inode and in sync with the file system cache. In a similar fashion, the extent cache entries are invalidated when the leaf-level indirect blocks are deallocated due to file deletion, file truncation, and file block migration or reorganization. Thus, the extent cache serves as a committed mapping LRU cache. In addition, the extent cache contains pointers to the leaf-level indirect blocks in the file system cache. Therefore the time required for accessing the extent cache is offset by a reduction in the time that would otherwise be spent searching the file system cache for the leaf-level indirect blocks.

Execution continues from step 137 to step 138. Execution also continues from step 135 to step 138 when there is a cache hit in step 135. In step 138, the pointed-to indirect block is fetched from the file system cache, or if there is not a hit in the file system cache, then from the file system in disk storage. Then, in step 139, the pointer to the data block containing data at the specified file offset is read from the indirect block. For example, this pointer is a block number of the file system block containing the data at the specified offset in the file having the specified file handle (FSID, FID). Execution continues from step 139 to step 140. In step 140, data is read from or written to the pointed-to direct block, and then the shared range lock is released, and execution returns.

Figure 6:
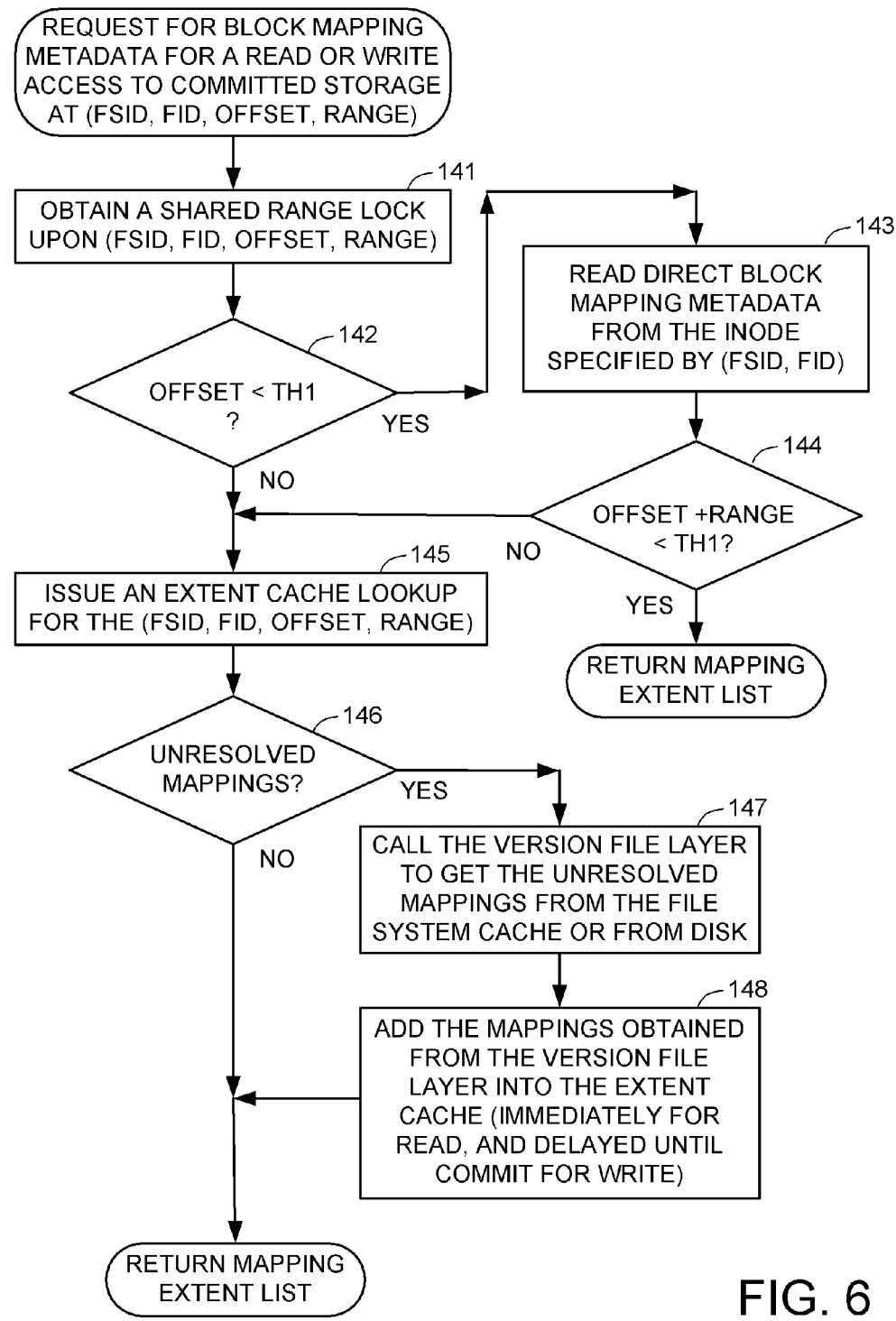
FIG. 6 is a flowchart showing use of the extent cache for looking up the data block addresses for a specified file handle and a specified offset and range in the logical extent of the file.

FIG. 6 shows use of the extent cache for looking up the committed data block addresses for a specified file handle and a specified offset and range in the logical extent of the file. When a read or write request specifies a range of logical blocks in the extent of a file, it is desirable to consider the entire range when looking up the data block addresses because a single indirect block may map the logical block addresses of a large number of file system data blocks. For example, for a conventional UNIX-based file system, a single indirect block will map the logical block addresses for 1024 file system data blocks.

In a first step 141, a shared range lock is obtained upon the entire specified range beginning at the specified offset in the specified file. If the block mapping is requested for a read operation, then the shared range lock is a read lock. If the block mapping is requested for a write operation, then the shared range lock is a write lock. Next, in step 142, if the offset is less then the threshold (TH1), then execution branches to step 143 to read the indirect block mapping metadata from the inode specified by the file handle (FSID, FID). Execution continues from step 143 to step 144. In step 144, if the specified offset plus the specified range is less than the threshold TH1, then all of the requested mapping information has been obtained from the inode of the file, and execution returns. Otherwise, execution branches from step 144 to step 145. Execution also continues from step 142 to step 145 if the specified offset is not less then the threshold (TH1).

In step 145 an extent cache lookup request is issued to lookup one or more indirect block pointers for the specified offset and range within the logical extent of the file having the specified file handle (FSID, FID). Then, in step 146, execution returns if the extent cache returns indirect block pointers for the entire range beginning at the specified offset, so that there are no unresolved mappings.

In step 146, if are unresolved mappings, then execution branches from step 146 to step 147. In step 147, the version file layer is called to get the unresolved mappings from the file system cache or from the disk storage. Execution continues from step 147 to step 148. In step 148, the mappings obtained from the version file layer are added to the extent cache. This is done immediately if the mapping is requested for a read operation. If the mapping is requested for a write operation, then the mappings obtained from the version file layer are added to the extent cache later when the new data for the write operation is committed to the on-disk file system. After step 148, execution returns.

If a file is extended for a write operation, data blocks are preallocated to the file, new data is written to the preallocated data blocks, and then the preallocated data blocks are committed to the on-disk file system. The process of extending the file may require one or more leaf-level indirect blocks to be allocated to the file for containing pointers to the new data blocks that are preallocated to the file. In this case extent cache entries for the newly allocated leaf-level indirect blocks are added to the extent cache when the preallocated data blocks are committed to the on-disk file system. This keeps the extent cache synchronized with the on-disk file system in order to simplify management of the extent cache.

Figure 7:
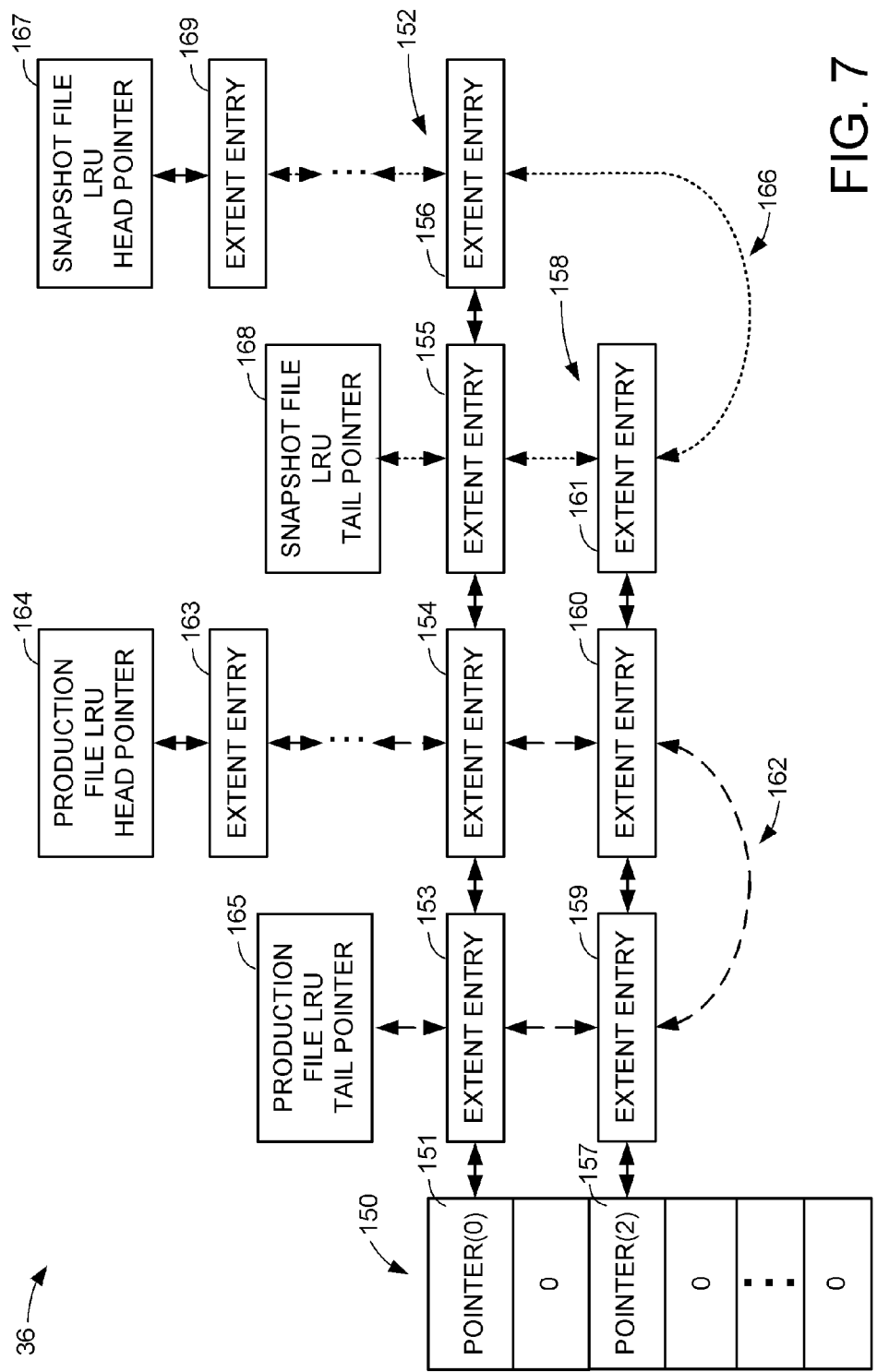
FIG. 7 is a block diagram of a preferred organization of the extent cache.

FIG. 7 shows a preferred organization of the extent cache 36. The extent cache includes a hash table 150 of pointers to hash lists 152, 158 of extent entries. For example, a first pointer 151 points to a hash list 152 of extent entries 153, 154, 155, and 156. A third pointer 157 points to a hash list 158 of extent entries 159, 160, 161. In this example, the other entries of the hash table 150 are zero, indicating that the other hash lists are empty.

The extent cache can be local to a particular file, local to a particular file system, or global to a number of file systems in the file server. In a preferred embodiment, for example, the extent cache is global to the file systems in the file server, and during a lookup of the extent cache for a specified file handle (FSID, FID) and a specified offset, the hash table 150 is indexed by a hash of the sum of the file system identifier (FSID) and the offset.

In general, the hash table is pre-sliced to pre-defined chunks. The chunk size can be changed with a configurable parameter. The default size is 1024 file system blocks. In addition, the extent size of each extent entry in a hash bucket is bounded to 1024 blocks. For example, each extent cache entry corresponds to one indirect block for the default extent size of an extent cache entry. The offset used in the computation of the hash is in units of the extent size of an extent cache entry and is aligned on the extent boundaries mapped by the leaf-level indirect blocks. For example, the file system block size is 8K bytes and the extent size of an extent cache entry is 1024 file system blocks, so that the extent size of an extent cache entry is 8 M bytes. In addition, for the file organization shown in FIG. 4, file block mapping by the leaf-level indirect blocks begins at a byte offset of 81,920. In this case, the offset in bytes is aligned to the extent boundaries mapped by the leaf-level indirect blocks by subtracting 81,920 bytes, and then converted to units of 8 M bytes by an arithmetic right shift by twenty-three bits. Then the hash function, for example, is the remainder of the sum of the file system identifier and the offset (in units of the extent size of an extent cache entry) divided by the number of hash list pointer entries in the hash table 150.

To keep up to a certain number of most recently accessed entries in the extent cache, each entry is kept in a least recently used (LRU) list. If an entry is not presently used, so that it is not in any hash list, then the entry is kept toward the head of the LRU list. For example, if an entry is invalidated, then the entry is moved to the head of the LRU list. If an entry is accessed, then the entry is moved to the tail of the LRU list. If an entry is needed for caching a new extent mapping, then the entry for the new extent mapping is taken from the head of the LRU list. For example, the hash table 150 and the hash lists 152, 158 are kept in sync with the inodes. In other words, a new extent cache entry is instantiated and linked to the hash table via a hash list when a write commit occurs upon a newly allocated indirect block a file, and a cache entry is removed from its hash list when an indirect block of a file is deallocated, for example, when the file is truncated or deleted. An extent cache entry may also be removed from a hash list when a new indirect block replaces an old indirect block associated with a particular offset during migration or reorganization of a file. Reorganization of a file, however, usually is done by moving the data blocks but not the indirect blocks, so that the extent cache entries are not modified during the reorganization.

The memory space for the extent entries is pre-allocated but bounded in the file server. The expected performance and the available memory space are the primary factors that determine the desired extent cache size. For example, the number of extent cache entries is 128K, and the size of the hash table 150 is 32K hash list pointers.

In a preferred embodiment as show in FIG. 7, a first LRU list 162 is kept for read-write production files, and a second LRU list 166 is kept for read-only snapshot copies of the production files. The first LRU list 162 includes a blank extent entry 163, and valid extent entries 153, 159, 160 154. A production file LRU head pointer 164 and a production file LRU tail pointer 165 are associated with this first LRU list 162. The second LRU list 166 includes valid extent entries 155, 161, 156, and a blank extent entry 169. A snapshot file LRU head pointer 167 and a snapshot file LRU tail pointer 168 are associated with the second LRU list 166.

The two separate LRU lists 162, 166 prevent snapshot access from negatively impacting the performance of production file access, and also permit each LRU list to have a separate allocation threshold. For example, initially, a certain number of blank entries are allocated to each LRU list. During operation, each entry is always kept on its respective list. Because production files are accessed more frequently than snapshot copies, more extent entries are kept on the first LRU list 162 than the second LRU list 166. Moreover, to speed up access to production file entries, each hash list is sorted so that production file entries are placed in front of any snapshot file entries. For example, when a new entry for a production file is added to a hash list, the new entry is placed at the front of the hash list. When a new entry for a snapshot file is added to a hash list, the new entry is placed after any production file entries on the hash list. An attribute of the file in the inode of the file or in a file system superblock indicates whether a file is a production file or a snapshot copy. The file handle may also include a flag indicating whether a file is a production file or a snapshot copy.

Figure 8:
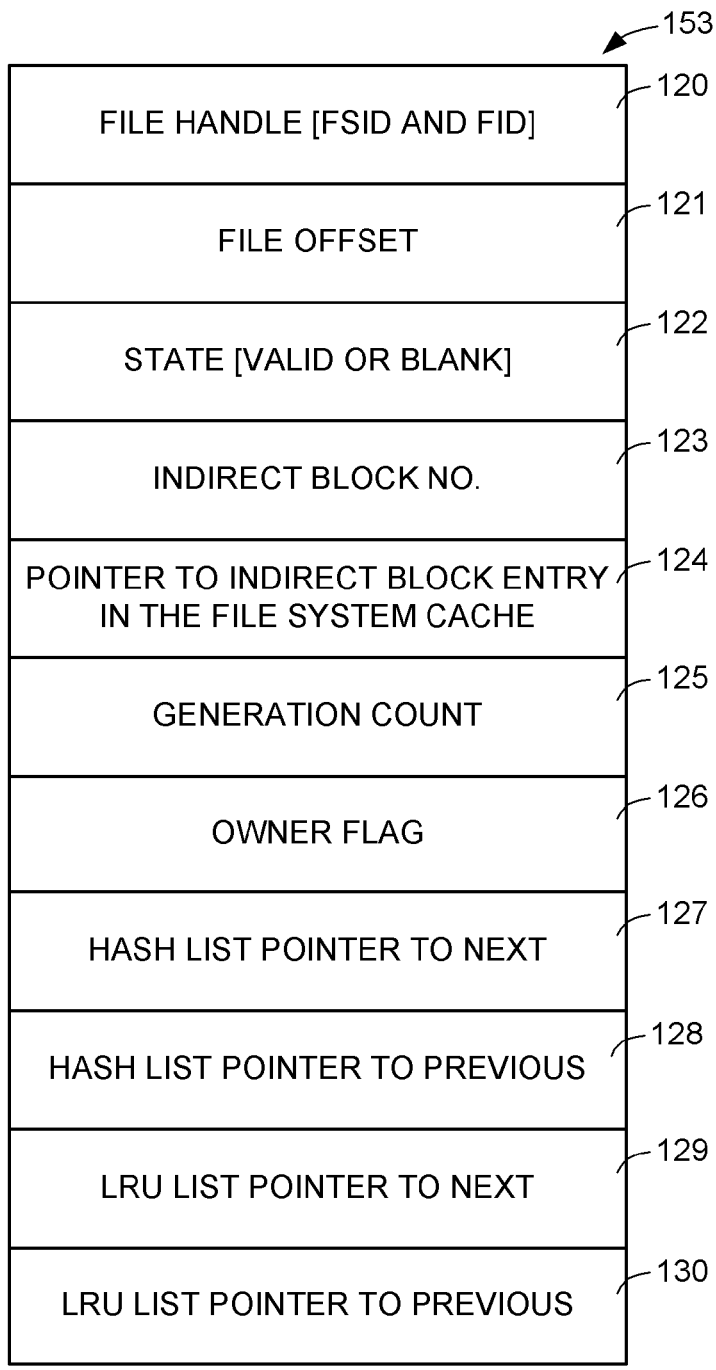
FIG. 8 is a block diagram of an extent cache entry.

FIG. 8 shows the fields in a single extent cache entry 153. The fields include a file handle (FSID and FID) 120, a file offset 121, a state (VALID or BLANK) 122, an indirect block number 123, an indirect block entry (i.e., a pointer to the indirect block in the "in core" file system in the file system cache) 124, a generation count 125, an owner flag 126, a pointer to the next entry in the hash list 127, a pointer to the previous entry in the hash list 128, a pointer to the next entry in the entry's LRU list 129, and a pointer to the previous entry in the entry's LRU list 130.

The owner flag 126 indicates whether or not the indirect block associated with the extent entry is shared among files. The generation count 125 is copied from a replication count attribute of the file when the extent entry is put on its hash list. A production file has exclusive ownership of an indirect block for write access when the generation count 125 in the extent entry is equal to the present value of the replication count attribute of the production file and the owner flag 126 is set in the entry.

Figure 9:
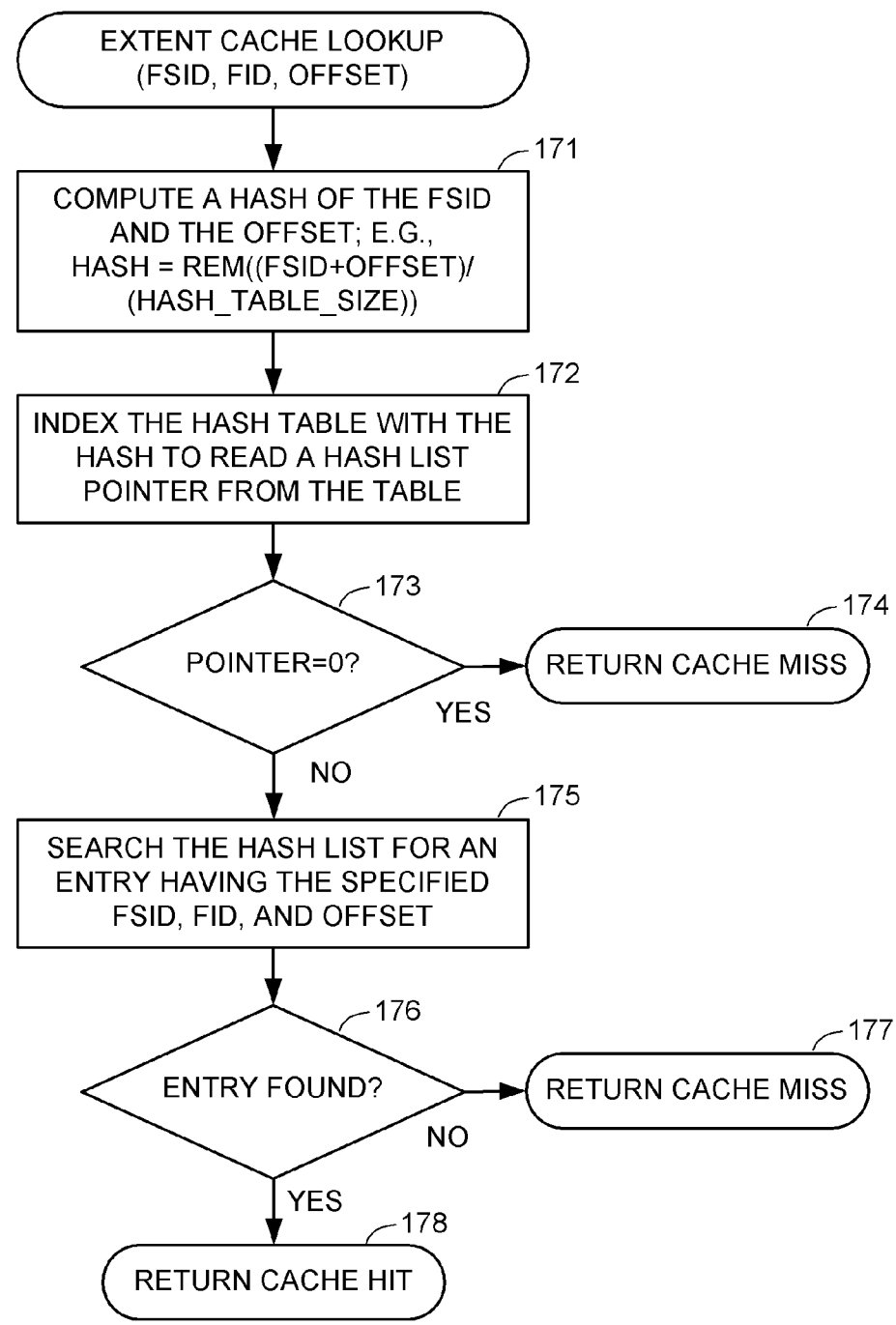
FIG. 9 is a flowchart of a procedure of accessing the extent cache to look up a pointer to a leaf-level indirect block containing data block addresses for a specified file handle and offset.

FIG. 9 shows a procedure for accessing the extent cache to look up a pointer to a leaf-level indirect block containing data block addresses for a specified file handle and offset. In a first step 171, a hash is computed from the file system ID (FSID) and the offset. For example, the offset in bytes is aligned and converted to units of the extent size of an extent cache entry, and then the aligned and converted offset is added to the file system ID (FSID), and the hash is the remainder of the sum divided by the number of entries in the hash table 150.

Next, in step 172, the hash table is indexed with the hash to read a hash list pointer from the table. Then in step 173, if the hash list pointer is zero, then execution returns in step 174 with a cache miss. Otherwise, execution continues to step 175. In step 175, the hash list indicated by the hash list pointer is searched for an entry having the specified file handle (FSID, FID) and offset. In step 176, if such an entry is not found in the hash list, then execution returns in step 177 with a cache miss. Otherwise, execution returns in step 178 with a cache hit.

Figure 10:
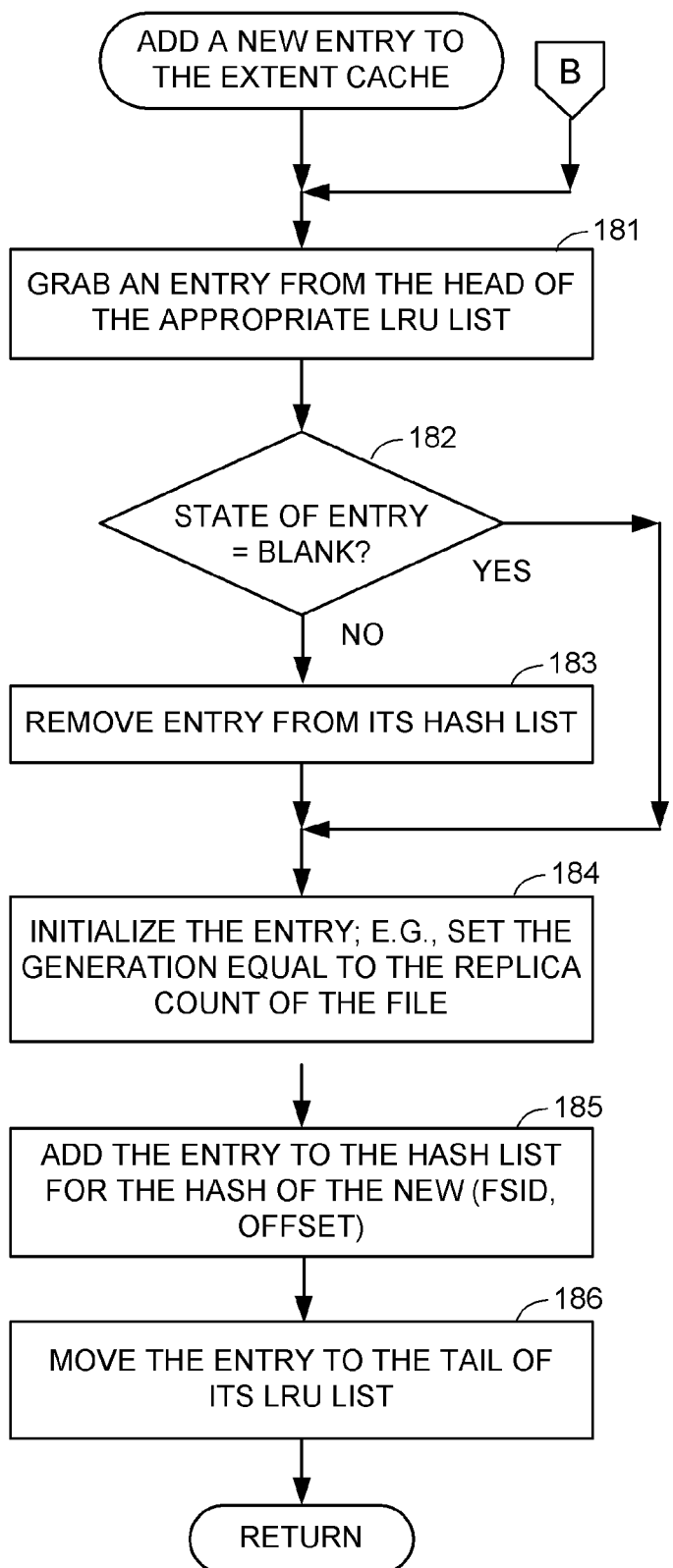
FIG. 10 is a flowchart of a procedure for adding a new entry to the extent cache.

FIG. 10 shows a procedure for adding a new entry to the extent cache. In step 181, an entry is grabbed from the head of the appropriate LRU list. If the new entry is for a production file, then the new entry is grabbed from the head of the production file LRU list. If the new entry is for a snapshot copy, then the new entry is grabbed from the head of the snapshot copy LRU list. In step 183, if the state of the entry grabbed from the head of the appropriate LRU list is not "BLANK", then execution continues to step 183 to remove this entry from its hash list. Execution continues from step 183 to step 184. Execution also branches to step 184 from step 182 if the state of the entry grabbed from the head of the appropriate LRU list is "BLANK".

In step 184, the entry is initialized by setting appropriate values in fields of the entry. For example, the generation count of the entry is set equal to the replica count of the file. In step 185, the entry is added to the hash list for the hash of the new file system ID (FSID) and offset. Then, in step 185, the entry is moved to the tail of its LRU list, and execution returns.

Figure 11:
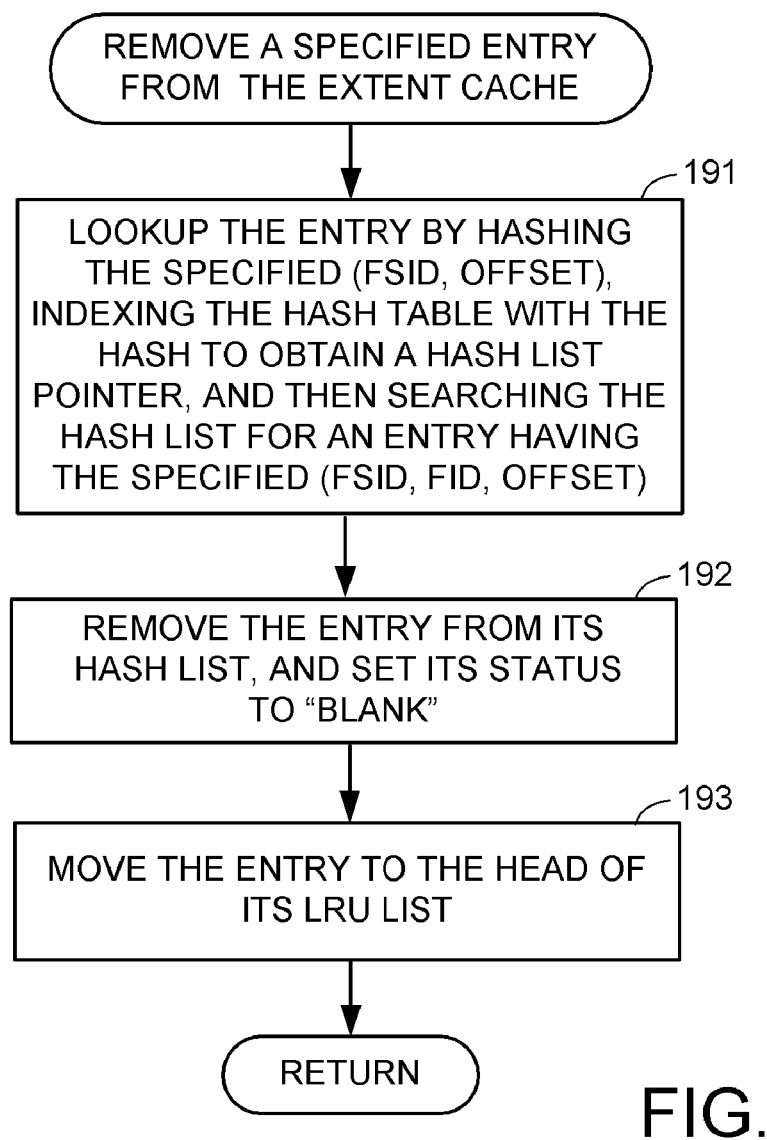
FIG. 11 is a flowchart of a procedure for removing a specified entry from the extent cache.

FIG. 11 shows a flowchart of a procedure for removing a specified entry from the extent cache. The specified entry is specified by a file handle (FSID, FID) and an offset. In a first step 181, the specified entry is looked up in the extent cache by computing the hash of the specified file system ID (FSID)

and the specified offset, and then indexing the hash table with the hash to obtain a hash list pointer, and then searching the hash list indicated by the pointer for an entry having the specified file handle (FSID, FID) and offset. In step 192, the entry is removed from its hash list, and the status of the entry is set to "BLANK". Finally, in step 193, the entry is moved to the head of its LRU list, and execution returns.

Sometimes it is desired to invalidate all cache entries for a given file or a given file system ID. Except for the case of a small file, the cache entries will be distributed over the hash lists so that it is efficient to scan all of the hash lists for entries having a specified file handle or a specified file system identifier, and whenever a matching entry is found, the entry is unlinked from the hash list, moved to the head of its LRU list, and its state is set to "BLANK." The scanning of a hash list for a production file can stop when an entry for a snapshot file is found. The invalidation can be performed by multiple threads, each of which scans the hash lists linked to a respective portion of the hash table.

Figure 12:
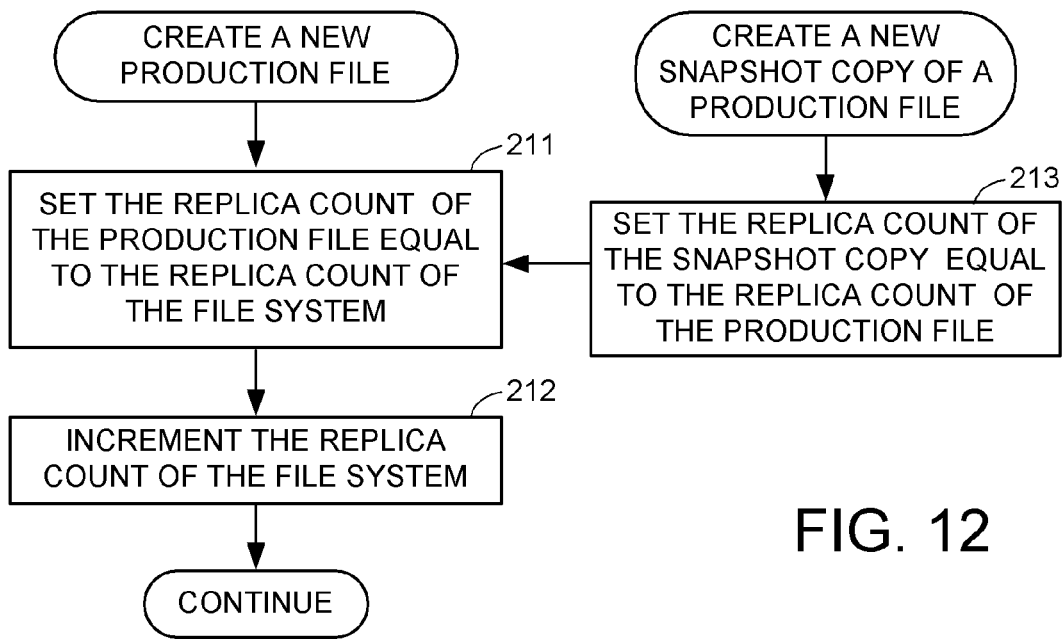
FIG. 12 is a flowchart of a procedure for management of replica counts when a new production file is created and when a new snapshot copy of a production file is created.

FIG. 12 is a flowchart of a procedure for management of a replica count attribute of each file in the file system, and a global replica count associated with the file system. When a new production file is created, in step 211, the replica count of the production file is set equal to the global replica count of the file system. Then, in step 212, the replica count is incremented.

When a new snapshot copy of a production file is created, in step 213, the replica count of the snapshot copy is set equal to the replica count of the production file. Execution continues from step 213 to step 211, to set the replica count of the production file equal to the global replica count of the file system, and then to step 212, to increment the global replica count of the file system.

When the new mapping for the new snapshot is committed, a new extent cache entry is put in the extent cache for the new snapshot. There is no need to update immediately a preexisting extent cache entry of a production file that shares data blocks with the new snapshot copy. Instead, a pre-existing extent cache entry is checked for a change in the sharing status if and when the pre-existing extent cache entry is accessed later for a "map for read" or a "map for write." This checking is shown is FIGS. 14 and 15.

Figure 13:
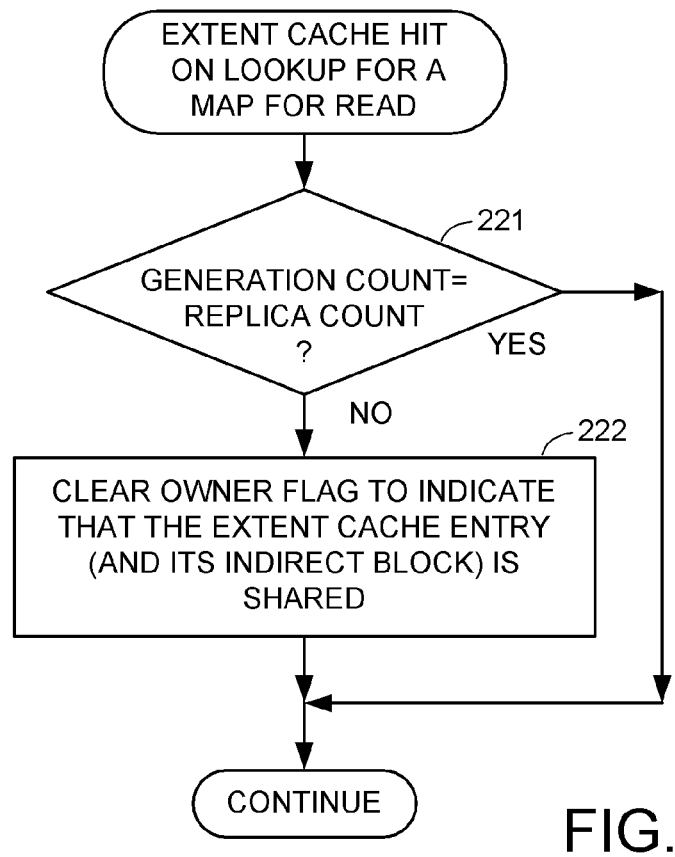
FIG. 13 is a flowchart of a procedure for updating the extent cache when an extent cache hit occurs during lookup for a map for read request.

FIG. 13 shows the updating of the extent cache block sharing status when an extent cache hit occurs during lookup for a "map for read" request for a mapping of a file. In step 221, if the generation count of the extent cache entry is not equal to the replica count of the file, then there has been a change to the sharing status because the leaf-level indirect block of the extent cache entry has become shared. In this case, execution continues to step 222 to clear the owner flag to indicate that the extent cache entry (and its associated indirect block) is now shared. Otherwise, if the generation count in the extent cache entry is equal to the replica count of the file, then there has been no change in the sharing status so that execution branches from step 221 to skip step 222.

Figure 14:
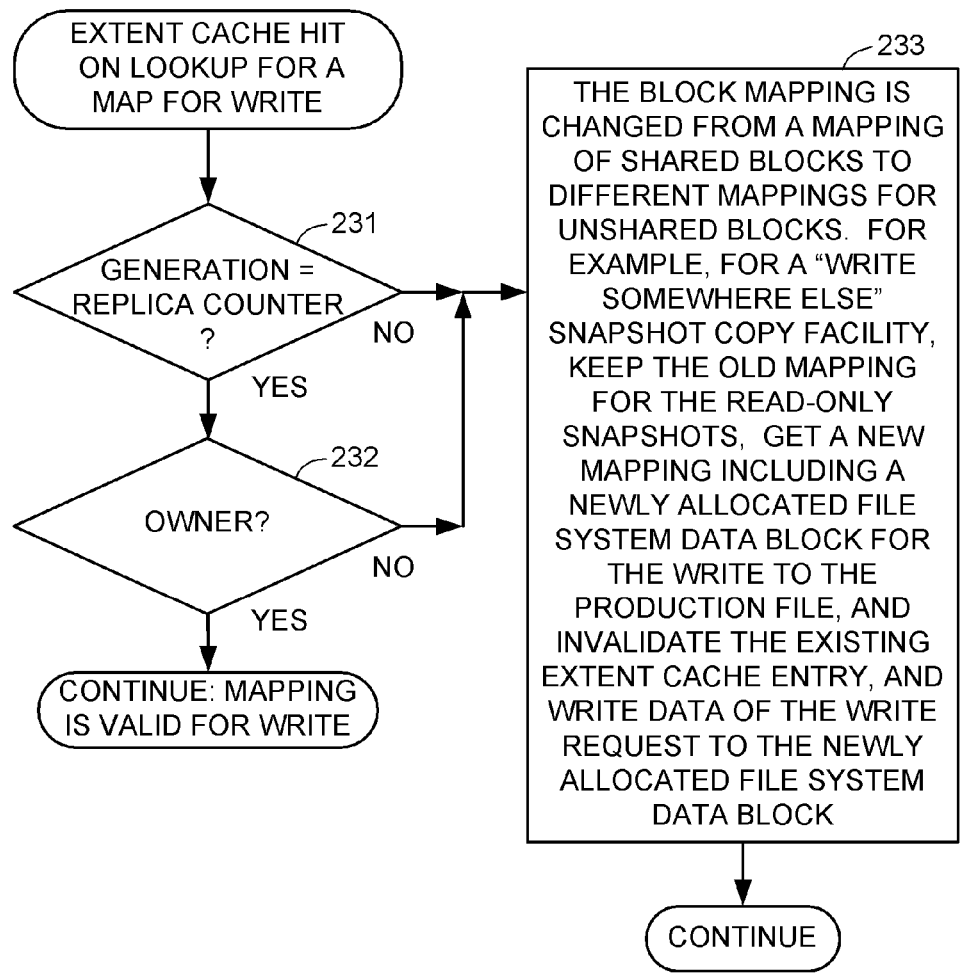
FIG. 14 is a flowchart of a procedure for updating the extent cache when an extent cache hit occurs during lookup for a map for write request.

FIG. 14 shows the updating of the extent cache block sharing status when an extent cache hit occurs during lookup for a "map for write" request for a file. In step 231, if the generation count in the extent cache entry is not equal to the replica count of the file, then there has been a change in the sharing status, and execution branches to step 233 to change the block mapping from a mapping of shared blocks to different mappings for the unshared blocks. Otherwise, if the generation count in the extent cache entry is not equal to the replica count of the file, then there has not been a change in the sharing status so execution continues to step 232 to read the "owner" flag of the extent cache entry to get the sharing status. If the owner flag is set, then the indirect block is not shared among files so that the existing mapping of the indirect block indicated by the extent cache entry is valid for write. If the owner flag is not set, then the indirect block is shared among files so that the existing mapping is not valid for write, and execution branches from step 232 to step 233 to change the block mapping from a mapping of shared blocks to different mappings for unshared blocks.

For example, in step 233, the file system manager of the file server follows a "write somewhere else" allocation policy. In accordance with the "write somewhere else" allocation policy, when new data for one file is to be written to a block that is shared between files, a new file system data block is allocated for receiving the new data. For example, when a data block is shared between a production file and a snapshot copy of the production file, and new data is written to the offset of this shared data block in the production file, a new file system data block is allocated to the production file and the new data is written to this new file system data block. Thus, the snapshot copy retains the old mapping and the production file receives a new mapping. In this case, the preexisting extent cache entry for the production file is invalidated, by unlinking the preexisting extent cache entry for the production file from its hash list, moving this extent cache entry to the head of the LRU list for production files, and setting the status of this extent cache entry to "BLANK".

Figure 15:
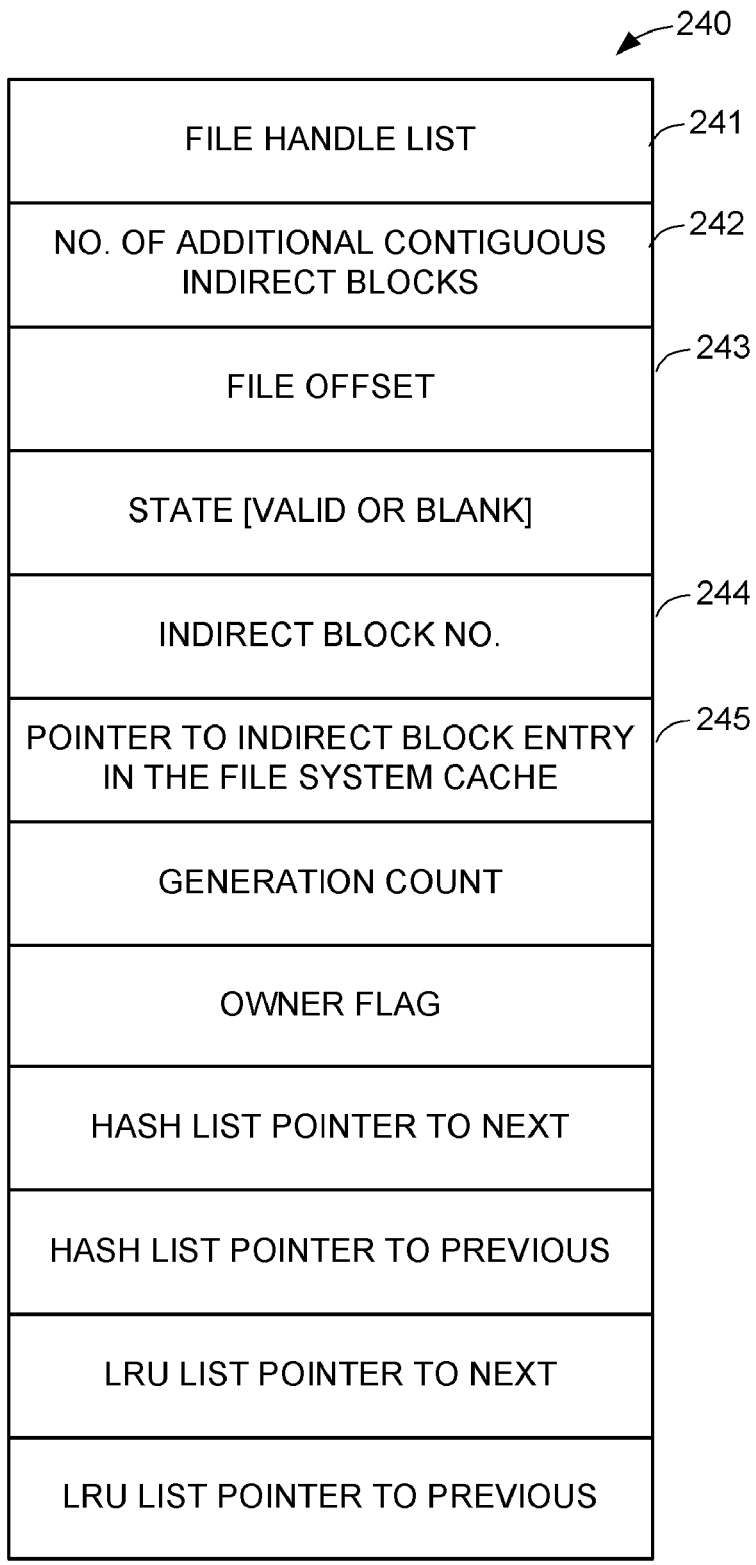
FIG. 15 is an alternative organization of an extent cache entry to permit multiple files and contiguous indirect blocks to share a single extent cache entry.

FIG. 15 shows an alternative organization of an extent cache entry to permit multiple files and contiguous indirect blocks to share a single extent cache entry. The extent cache entry 240 includes a file handle list field 241 containing a list or a pointer to a list of all the file handles of the files that share the single extent cache entry 240. For example, multiple snapshot copies may often share a single leaf-level indirect block.

The extent cache entry 240 also includes a field 242 for specifying that a certain number of additional contiguous indirect blocks share the extent cache entry. In this case, the byte offset range associated with a single extent cache entry is mapped by a variable number of indirect blocks up to a certain fixed number of indirect blocks. Such a situation may occur frequently for a file system manager that attempts to allocate contiguous indirect blocks to the extent of a new file or when a file is extended, and for a file system reorganizer that attempts to reorganize a file by allocating contiguous indirect blocks to the extent of a file begin reorganized. For example, the byte offset range associated with a single extent cache entry is mapped by one to eight indirect blocks. In this case, the offset used in the computation of the hash for indexing the hash table is arithmetic right sifted by an additional three bits, so that the file offset mapped by up to eight contiguous leaf-level indirect blocks in a file may have the same hash value. Therefore, when searching a hash list, the file offset field 243 in combination with the field 242 for the number of additional contiguous indirect blocks determines up to eight different offsets which may match an offset that is associated with a single indirect block.

For example, if the field 242 contains a value of two, then the extent cache entry 240 is shared among three indirect blocks. The first indirect block maps an offset beginning at the offset in the file offset field 243, and the first indirect block has a block number found in the field 244 and an entry in the file system cache that is pointed to by a pointer in the indirect block entry field 245. The second indirect block maps an offset beginning at the offset in the file offset field 243 plus the number of bytes mapped by one indirect block, and the second indirect block has a block number equal to one plus the block number found in the field 244 and an entry in the file system cache that is pointed to by one plus the pointer in the indirect block entry field 245. The third indirect block maps an offset beginning at the offset in the file offset field 243 plus twice the number of bytes mapped by one indirect block, and the third indirect block has a block number equal to two plus the block number found in the field 244 and an entry in the file system cache that is pointed to by two plus the pointer in the indirect block entry field 245.

Figure 16:
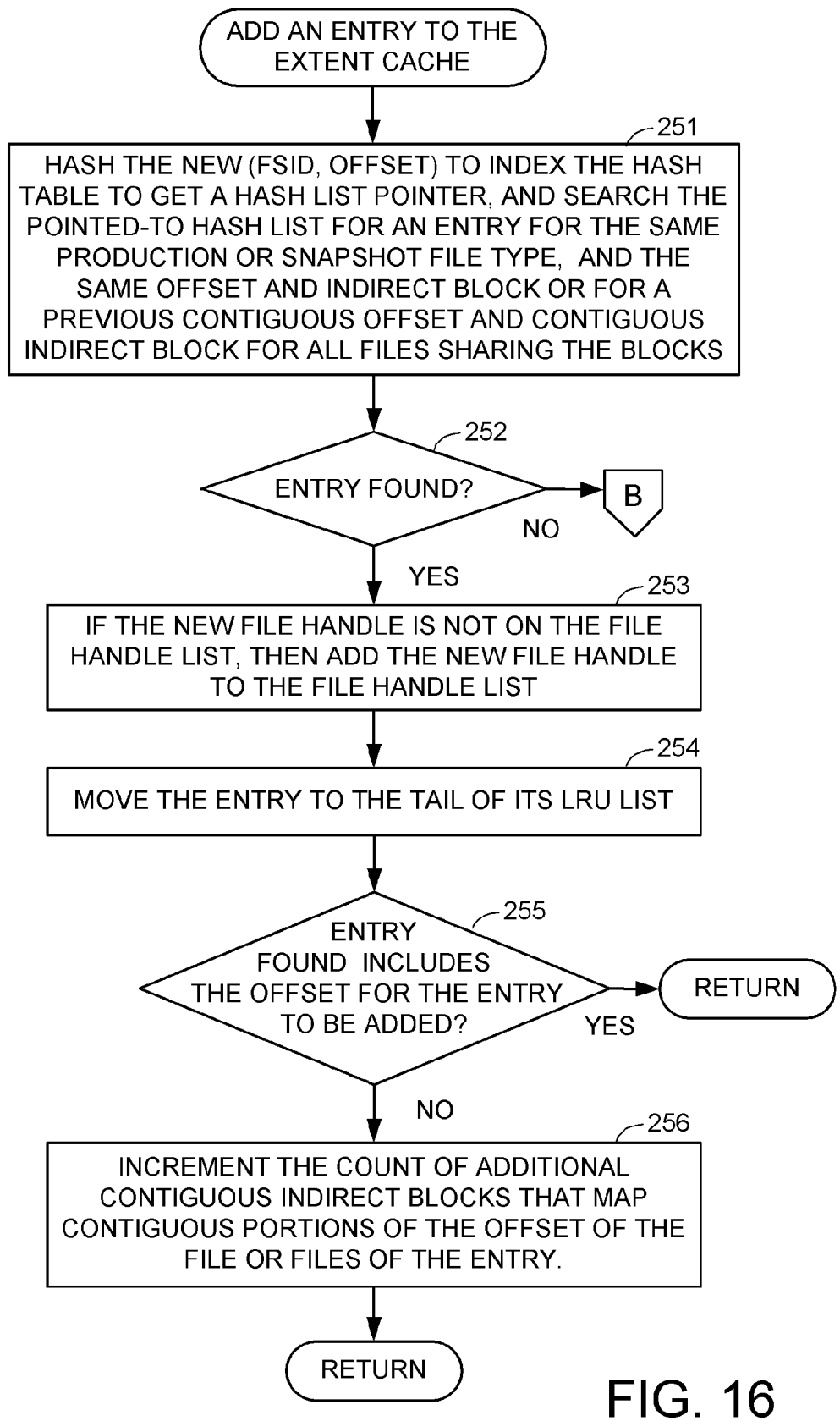
FIG. 16 is a flowchart of a procedure for adding a new entry to the extent cache when the extent cache entry has the alternative organization of FIG. 15.

FIG. 16 is a flowchart of a procedure for adding an entry for a specified file and offset to the extent cache when each extent cache entry has the alternative organization of FIG. 15. In this case, the extent cache is first searched for an existing entry that could be modified so that it may be shared with the specified file, and if such an existing entry is not found, then a new entry is added for the specified file using the procedure of FIG. 10.

In a first step 251 of FIG. 16, the FSID and offset of the specified file are hashed to index the hash table to get a hash list pointer and to search the pointed-to hash list for an entry for the same production or snapshot file type, and the same offset and the same indirect block or the offset mapped by the same previous contiguous indirect block for the same previous contiguous offset for all files sharing the block. For example, the pointed-to hash list may include an entry for the offset mapped by the same previous contiguous indirect block for the same previous contiguous offset when a file is extended or reorganized to contain indirect blocks that are contiguous in storage and also map contiguous logical blocks in the offset of one or more files. In step 252, if such an entry is not found, then execution branches to step 181 of FIG. 10 to add a new entry to the extent cache, and in this case, the new entry is added to the hash list that was searched in step 251.

In step 252, if such an entry is found, then execution continues to step 253. In step 253, if the new file handle for the entry to be added is not on the file handle list of the entry found, then the new file handle is added to the file handle list of the entry found. Then in step 254, the entry is moved to the tail of its LRU list. In step 255, if the entry found includes the offset for the entry to be added, then execution returns. Otherwise, execution continues to step 256. In this case, the entry found includes the offset for a previous contiguous indirect block, so in step 256 the count of additional contiguous indirect blocks is incremented, and then execution returns.

In lieu of the procedure of FIG. 16, a background routine may scan the extent cache for pairs of entries that can be combined so that a pair of entries is merged into a single entry that is shared among files or among contiguous indirect blocks. In this case, the background routine scans each hash list to find a pair of entries for the same production or snapshot file type that can be combined into a single entry. Such a pair of entries is found when each entry in the pair has the same offset or offsets for the same indirect block or blocks, or when the two entries have associated indirect blocks that are contiguous in storage and map contiguous offsets in all of the files of the two entries.

In view of the above, there has been described an extent cache that serves as a committed mapping LRU cache. The extent cache improves file access read and write performance by returning a mapping for the data blocks to be read or written without having to iterate through intermediate level indirect blocks of the file. In addition, the extent cache contains pointers to the leaf-level indirect blocks in the file system cache. Therefore, in most cases, the time spent looking up pointers in the extent cache is offset by a reduction in the time that would otherwise be spent in locating the leaf-level indirect blocks in the file system cache. In a preferred implementation, the extent cache has a first least recently used (LRU) list and cache entry allocation for production files, and a second LRU list and cache entry allocation for snapshot copies of the production files. The two LRU lists prevent access to the snapshots from having a negative impact on the access to the production files, and differentiate the quality of service provided to the snapshot files from the quality of service provided to the production files.

What is claimed is:

1. A computer-implemented method of operating a file server, the file server including random access memory, data storage, and a data processor coupled to the random access memory and coupled to the data storage for maintaining a file system in the data storage and for maintaining a file system cache in the random access memory, the file system including file system blocks, the file system blocks including inodes defining attributes of files in the file system, data blocks storing data of the files, and indirect blocks linking inodes to data blocks so that at least some of the files each include an inode and a hierarchy of indirect blocks linking the inode to data blocks, the hierarchy including leaf-level indirect blocks each containing pointers to data blocks, and the file system cache containing recently accessed file system blocks, the method comprising the data processor executing computer instructions stored on a non-transitory computer-readable storage medium to perform the steps of:

maintaining, in the random access memory, an extent cache of pointers to recently accessed leaf-level indirect blocks, the extent cache including an index for searching the extent cache for a pointer to a recently accessed leaf-level indirect block mapping a data block of a specified file to a specified offset in a logical extent of the specified file, and responding to a request to read data from or write data to the specified offset in the logical extent of the specified file by:

(1) accessing the index to search the extent cache for the pointer to the recently accessed leaf-level indirect block mapping the data block of the specified file to the specified offset in the logical extent of the specified file, and to find, in the extent cache, the pointer to the recently accessed leaf-level indirect block mapping the data block of the specified file to the specified offset in the logical extent of the specified file, and (2) using the pointer found in the extent cache to obtain a pointer to the data block mapped to the specified offset in the logical extent of the specified file, and (3) using the pointer to the data block mapped to the specified offset in the logical extent of the specified file to read data from or write data to the data block mapped to the specified offset in the logical extent of the specified file.

2. The computer-implemented method as claimed in claim 1, wherein the pointer found in the extent cache is a pointer to an entry of the file system cache containing the leaf-level indirect block containing a pointer to the data block mapped to the specified offset in the logical extent of the specified file, and the step of using the pointer found in the extent cache includes accessing the file system cache with the pointer found in the extent cache in order to obtain the pointer to the data block mapped to the specified offset in the logical extent of the specified file.

3. The computer-implemented method as claimed in claim 1, wherein the pointer found in the extent cache is an indirect block number of the leaf-level indirect block containing a pointer to the data block mapped to the specified offset in the logical extent of the specified file, and the step of using the pointer found in the extent cache includes using the indirect block number to access the data storage to fetch, from the data storage, the leaf-level indirect block containing a pointer to the data block mapped to the specified offset in the logical extent of the specified file, and reading, from the indirect block fetched from the data storage, the pointer to the data block mapped to the specified offset in the logical extent of the specified file.

4. The computer-implemented method as claimed in claim 1, wherein the index includes a hash table of pointers to hash lists of extent cache entries, and the extent cache entries include the pointers to the recently accessed leaf-level indirect blocks, and the step of accessing the index to search the extent cache for the pointer to the recently accessed leaf-level indirect block mapping the data block of the specified file to the specified offset in the logical extent of the specified file includes hashing the specified offset to index the hash table to obtain a pointer to an indexed one of the hash lists, and then searching the indexed one of the hash lists to find an extent cache entry including a file identifier identifying the specified file.

5. The computer-implemented method as claimed in claim 4, wherein the file server includes a snapshot copy facility for creating snapshot copies of production files in the file system, and the maintaining of the extent cache includes keeping pointers to leaf-level indirect blocks of the production files in extent cache entries towards the beginnings of the hash lists in front of extent cache entries including pointers to leaf-level indirect blocks of the snapshot copies of the production files.

6. The computer-implemented method as claimed in claim 1, wherein:
some of the leaf-level indirect blocks in the file system are shared between files in the file system, and the computer-implemented method further includes maintaining in the extent cache, for each of the pointers to the leaf-level indirect blocks in the extent cache, an indication of whether or not the pointed-to leaf-level indirect block is shared between files in the file system, and
the computer-implemented method further includes responding to a write request for writing data to a production file of the file system by accessing the extent cache and finding in the extent cache an indication that a pointed-to leaf-level indirect block of the production file is shared between files in the file system, and in response to finding in the extent cache the indication that the pointed-to leaf-level indirect block of the production file is shared between files in the file system, obtaining a new logical block mapping specifying a newly allocated file system data block for receiving data of the write request, invalidating the pointer in the extent cache to the pointed-to leaf-level indirect block of the production file, and writing the data of the write request to the newly allocated file system data block.

7. The computer-implemented method as claimed in claim 1, wherein:
some of the leaf-level indirect blocks in the file system are shared between production files in the file system and snapshot copies of the production files in the file system, and the files in the file system each have a replica count attribute, and when a snapshot copy of a production file is created, the replica count of the snapshot copy is set equal to the replica count of the production file and the replica count of the production file is changed, and
the computer-implemented method further includes maintaining in the extent cache, for each of the pointers to the leaf-level indirect blocks in the extent cache, a generation count set equal to the replica count of a file having the pointed-to leaf-level indirect block when said each of the pointers to the leaf-level indirect blocks is placed in the extent cache, and
the computer-implemented method further includes responding a write request for writing data to a specified production file of the file system by accessing the extent cache and finding in the extent cache that the generation count for a pointed-to leaf-level indirect block of the specified production file is not equal to the replica count of the specified production file, and in response to finding in the extent cache that the generation count for the pointed-to leaf-level indirect block of the specified production file is not equal to the replica count of the specified production file, invalidating the pointer in the extent cache to the pointed-to leaf-level indirect block of the specified production file, and obtaining a new logical block mapping specifying a newly allocated file system data block for receiving data of the write request, and writing the data of the write request to the newly allocated file system data block.

8. The computer-implemented method as claimed in claim 1, wherein the file server includes a snapshot copy facility for creating snapshot copies of production files in the file system, and the maintaining of the extent cache includes maintaining a first least recently used list of the pointers to recently accessed leaf-level indirect blocks in the production files, and maintaining a second least recently used list of the pointers to recently accessed leaf-level indirect blocks in the snapshot copies of the production files.

9. The computer-implemented method as claimed in claim 8, which includes keeping a first number of extent cache entries on the first least recently used list and not removing the extent cache entries from the first least recently used list when the extent cache entries on the first least recently used list are invalidated, and keeping a second number of extent cache entries on the second least recently used list and not removing the extent cache entries from the second least recently used list when the extent cache entries on the second least recently used list are invalidated.

10. A file server comprising:
random access memory;
data storage, and
a data processor coupled to the random access memory and coupled to the data storage for maintaining a file system in the data storage and maintaining a file system cache in the random access memory, the file system including file system blocks, the file system blocks including inodes defining attributes of files in the file system, data blocks storing data of the files, and indirect blocks linking inodes to data blocks so that at least some of the files each include an inode and a hierarchy of indirect blocks linking the inode to data blocks, the hierarchy including leaf-level indirect blocks each containing pointers to data blocks, and the file system cache containing recently accessed file system blocks, and
a non-transitory computer readable storage medium storing computer instructions that, when executed by the data processor, perform the steps of:
maintaining, in the random access memory, an extent cache of pointers to recently accessed leaf-level indirect blocks, the extent cache including an index for searching the extent cache for a pointer to a recently accessed leaf-level indirect block mapping a data block of a specified file to a specified offset in a logical extent of the specified file, and responding to a request to read data from or write data to the specified offset in the logical extent of the specified file by:

(1) accessing the index to search the extent cache for the pointer to the recently accessed leaf-level indirect block mapping the data block of the specified file to the specified offset in the logical extent of the specified file, and to find, in the extent cache, the pointer to the recently accessed leaf-level indirect block mapping the data block of the specified file to the specified offset in the logical extent of the specified file, and (2) using the pointer found in the extent cache to obtain a pointer to the data block mapped to the specified offset in the logical extent of the specified file, and (3) using the pointer to the data block mapped to the specified offset in the logical extent of the specified file to read data from or write data to the data block mapped to the specified offset of the specified file.

11. The file server as claimed in claim 10, wherein the pointer found in the extent cache is a pointer to an entry of the file system cache containing the leaf-level indirect block containing a pointer to the data block mapped to the specified offset in the logical extent of the specified file, and the step of using the pointer found in the extent cache includes accessing the file system cache with the pointer found in the extent cache in order to obtain the pointer to the data block mapped to the specified offset in the logical extent of the specified file.

12. The file server as claimed in claim 10, wherein the index includes a hash table of pointers to hash lists of extent cache entries, and the extent cache entries include the pointers to the recently accessed leaf-level indirect blocks, and the step of accessing the index to search the extent cache for the pointer to the recently accessed leaf-level indirect block mapping the data block of the specified file to the specified offset in the logical extent of the specified file includes hashing the specified offset to index the hash table to obtain a pointer to an indexed one of the hash lists, and then searching the indexed one of the hash lists to find an extent cache entry including a file identifier identifying the specified file.

13. The file server as claimed in claim 12, which further includes a snapshot copy facility for creating snapshot copies of production files in the file system, and the maintaining of the extent cache includes keeping pointers to leaf-level indirect blocks of the production files in extent cache entries towards the beginnings of the hash lists in front of extent cache entries including pointers to leaf-level indirect blocks of the snapshot copies of the production files.

14. The file server as claimed in claim 10, wherein:
some of the leaf-level indirect blocks in the file system are shared between files in the file system, and
the computer instructions, when executed by the data processor, further perform the steps of maintaining in the extent cache, for each of the pointers to the leaf-level indirect blocks in the extent cache, an indication of whether or not the pointed-to leaf-level indirect block is shared between files in the file system, and
the computer instructions, when executed by the data processor, further perform the steps of responding to a write request for writing data to the specified offset of the specified file, and upon accessing the extent cache in response to the write request, finding in the extent cache an indication that the pointed-to leaf-level indirect block is shared between files in the file system, and in response to finding in the extent cache the indication that the pointed-to leaf-level indirect block is shared between files in the file system, obtaining a new logical block mapping specifying a newly allocated file system data block for receiving data of the write request, invalidating the pointer in the extent cache to the pointed-to leaf-level indirect block, and writing the data of the write request to the newly allocated file system data block.

15. The file server as claimed in claim 10, wherein:
some of the leaf-level indirect blocks in the file system are shared between production files in the file system and snapshot copies of the production files in the file system, and the files in the file system each have a replica count attribute, and when a snapshot copy of a production file is created, the replica count attribute of the snapshot copy is set equal to the replica count of the production file and the replica count attribute of the production file is changed, and
the computer instructions, when executed by the data processor, further perform the step of maintaining in the extent cache, for each of the pointers to the leaf-level indirect blocks in the extent cache, a generation count set equal to the replica count of a file having the pointed-to leaf-level indirect block when said each of the pointers to the leaf-level indirect blocks is placed in the extent cache, and
the computer instructions, when executed by the data processor, further perform the steps of responding a write request for writing data to a specified production file of the file system by accessing the extent cache and finding in the extent cache that the generation count for a pointed-to leaf-level indirect block of the specified production file is not equal to the replica count of the specified production file, and in response to finding in the extent cache that the generation count for the pointed-to leaf-level indirect block of the specified production file is not equal to the replica count of the specified production file, invalidating the pointer in the extent cache to the pointed-to leaf-level indirect block of the specified production file, and obtaining a new logical block mapping specifying a newly allocated file system data block for receiving data of the write request, and writing the data of the write request to the newly allocated file system data block.

16. The file server as claimed in claim 10, which further includes a snapshot copy facility for creating snapshot copies of production files in the file system, and the maintaining of the extent cache includes maintaining a first least recently used list of pointers to recently accessed leaf-level indirect blocks in the production files, and maintaining a second least recently used list of pointers to recently accessed leaf-level indirect blocks in the snapshot copies of the production files.

17. The file server as claimed in claim 16, wherein the maintaining of the extent cache further includes keeping a first number of extent cache entries on the first least recently used list and not removing the extent cache entries from the first least recently used list when the extent cache entries on the first least recently used list are invalidated, and keeping a second number of extent cache entries on the second least recently used list and not removing the extent cache entries from the second least recently used list when the extent cache entries on the second least recently used list are invalidated.

18. A non-transitory computer readable storage medium storing computer instructions that, when executed by a data processor in a file server, perform the steps of:
maintaining, in random access memory of the file server, an extent cache of pointers to recently accessed leaf-level indirect blocks of a file system in data storage of the file server, the extent cache including an index for searching the extent cache for a pointer to a recently accessed leaf-level indirect block mapping a data block of a specified file to a specified offset in a logical extent of the specified file, and responding to a request to read data from or write data to the specified offset in the logical extent of the specified file by:

(1) accessing the index to search the extent cache for the pointer to the recently accessed leaf-level indirect block mapping the data block of the specified file to the specified offset in the logical extent of the specified file, and to find, in the extent cache, the pointer to the recently accessed leaf-level indirect block mapping the data block of the specified file to the specified offset in the logical extent of the specified file, and (2) using the pointer found in the extent cache to obtain a pointer to the data block mapped to the specified offset in the logical extent of the specified file, and (3) using the pointer to the data block mapped to the specified offset in the logical extent of the specified file to read data from or write data to the data block mapped to the specified offset of the specified file.

19. The non-transitory computer readable storage medium as claimed in claim 18, wherein the pointer found in the extent cache is a pointer to an entry of a file system cache containing the leaf-level indirect block containing a pointer to the data block mapped to the specified offset in the logical extent of the specified file, and the step of using the pointer found in the extent cache includes accessing the file system cache with the pointer found in the extent cache in order to obtain the pointer to the data block mapped to the specified offset in the logical extent of the specified file.

20. The non-transitory computer readable storage medium as claimed in claim 18, wherein the file server includes a snapshot copy facility for creating snapshot copies of production files in the file system, and the maintaining of the extent cache includes maintaining a first least recently used list of the pointers to recently accessed leaf-level indirect blocks in the production files, and maintaining a second least recently used list of pointers to recently accessed leaf-level indirect blocks in the snapshot copies of the production files.

* * * * *